(12) United States Patent
Kim et al.

(10) Patent No.: US 7,360,942 B2
(45) Date of Patent: Apr. 22, 2008

(54) RECEIVING CONTAINER FOR A DISPLAY APPARATUS, BACKLIGHT ASSEMBLY AND DISPLAY APPARATUS HAVING THE RECEIVING CONTAINER, AND METHOD THEREOF

(75) Inventors: Jeung-Soo Kim, Seoul (KR); Young-Bee Chu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/612,880

(22) Filed: Dec. 19, 2006

(65) Prior Publication Data

US 2007/0139935 A1 Jun. 21, 2007

(30) Foreign Application Priority Data

Dec. 19, 2005 (KR) ............... 10-2005-0125213

(51) Int. Cl.
*F21V 33/00* (2006.01)
(52) U.S. Cl. .................. 362/632; 362/634; 362/612
(58) Field of Classification Search ........... 362/632, 362/633, 634, 611, 612, 613, 555
See application file for complete search history.

(56) References Cited

U.S. PATENT DOCUMENTS 7,207,707 B2 * 4/2007 Huang et al. ............... 362/614
2007/0115691 A1 * 5/2007 Yu .............................. 362/632

FOREIGN PATENT DOCUMENTS

JP 2003107467 4/2003

\* cited by examiner

*Primary Examiner*—Laura Tso
(74) *Attorney, Agent, or Firm*—Cantor Colburn LLP

(57) ABSTRACT

A receiving container for a display apparatus receives a light-guiding unit and a light-generating unit disposed adjacent to a side surface of the light-guiding unit. The receiving container includes a bottom plate, a sidewall, and a gap-regulating portion. The light-guiding unit is disposed on the bottom plate. The sidewall faces the side surface of the light-guiding unit and is disposed at a peripheral portion of the bottom plate. The gap-regulating portion is formed at the sidewall or the bottom plate, to reduce a gap between the light-generating unit and the light-guiding unit. Thus, loss of light emitted by the point light source decreases so that power consumption of a backlight assembly and a display apparatus is reduced.

30 Claims, 25 Drawing Sheets

RECEIVING CONTAINER FOR A DISPLAY APPARATUS, BACKLIGHT ASSEMBLY AND DISPLAY APPARATUS HAVING THE RECEIVING CONTAINER, AND METHOD THEREOF

This application claims priority to Korean Patent Application No. 2005-125213, filed on Dec. 19, 2005 and all the benefits accruing therefrom under 35 U.S.C. §119, and the contents of which in its entirety are herein incorporated by reference.

BACKGROUND OF THE INVENTION

1. Field of the Invention

The present invention relates to a receiving container for a display apparatus, a backlight assembly having the receiving container, a display apparatus having the receiving container, and a method thereof. More particularly, the present invention relates to a receiving container for a display apparatus, which is capable of reducing loss of light emitted from a point light source, a backlight assembly and a display apparatus having the receiving container, and a method of reducing a loss of light emitted from the point light source.

2. Description of the Related Art

In general, a liquid crystal display ("LCD") apparatus is applied to a personal computer, a notebook computer, a navigator for an automobile, a television set, etc., to display an image from the data converted to electrical format. Since an LCD apparatus has advantages such as a light weight, a small volume, etc., the LCD apparatus is widely used in various industrial fields.

An LCD apparatus includes a backlight assembly in order to display an image at a place with limited light. Recently, research has been conducted for reducing volume, thickness and weight of an LCD apparatus, and for improving light-using efficiency to reduce power consumption and display quality of a display apparatus. A backlight assembly occupies most of the volume, thickness, and weight of a display apparatus. Thus, reducing volume, thickness and weight of a backlight assembly, and improving power consumption and brightness thereof relates directly to technical competitiveness and design competitiveness of an LCD apparatus.

A small and medium-sized LCD apparatus employed by a mobile device, such as a cellular phone and a personal digital assistant, includes a light-emitting diode ("LED") that has a low power consumption, a small volume, a light weight, etc.

Recently, brightness of a backlight assembly and an LCD apparatus has been improved by an LED emitting high luminance light. However, a light-using efficiency of the LED is not high enough. Thus, power consumption of a backlight assembly and an LCD apparatus increases.

A low light-using efficiency is caused by a structure of a conventional mobile LCD apparatus. Particularly, the conventional mobile LCD apparatus includes a light-guiding unit, which guides light generated by an LED to a display panel. The LED is disposed adjacent to a side surface of the light-guiding unit. The light generated by the LED enters the light-guiding unit, but a portion of the light is reflected by the side surface of the light guide plate, and is thus leaked. As a gap between the light-guiding unit and the LED increases, light leakage increases.

Therefore, preferably, a light-emitting portion of the LED is disposed as close to the light-guiding unit as possible. Conventionally, a gap between the light-emitting portion of the LED and the light-guiding unit is designed to be smaller than about 1 mm. However, the gap between the light-emitting portion of the LED and the light-guiding unit becomes greater than the designed value due to a margin of members of the backlight assembly in a manufacturing process.

Particularly, the LED is spaced apart from the light-guiding unit by a distance greater than the designed range because of a cutting margin caused by a process of cutting a printed circuit film on which the LED is mounted, an injection margin caused by a process of injection-molding the light-guiding unit, etc. Therefore, a portion of light generated by the LED is not guided by the light-guiding unit and is lost, so that power consumption of the backlight assembly and a display apparatus having the backlight assembly increases.

BRIEF SUMMARY OF THE INVENTION

The present invention provides a receiving container for a display apparatus reducing loss of light emitted from a point light source.

The present invention also provides a backlight assembly having the above receiving container.

The present invention also provides a display apparatus having the above backlight assembly.

The present invention also provides a method of reducing a loss of light from a point light source in a backlight assembly.

In exemplary embodiments of the present invention, a receiving container for a display apparatus (hereinafter, referred to as a "receiving container") receives a light-guiding unit and a light-generating unit disposed adjacent to a side surface of the light-guiding unit. The receiving container includes a bottom plate, a sidewall, and a gap-regulating portion. The light-guiding unit is disposed on the bottom plate. The sidewall faces the side surface of the light-guiding unit and is disposed at a peripheral portion of the bottom plate. The gap-regulating portion is formed at the sidewall or the bottom plate, to reduce a gap between the light-generating unit and the light-guiding unit.

The light-generating unit may include a printed circuit film and a light source mounted on the printed circuit film. The light source may include a light-emitting diode.

The gap-regulating portion may be a protrusion. The protrusion protrudes from the sidewall and presses the light source toward the light-guiding unit.

Alternatively, the gap-regulating portion may be a guiding boss. The guiding boss protrudes from the sidewall and slants toward the sidewall from the light-guiding unit, and is insertable into an opening formed at the printed circuit film.

Alternatively, the gap-regulating portion may be a guiding groove formed at the sidewall.

In other exemplary embodiments of the present invention, a backlight assembly includes a light-guiding unit, a light-generating unit, and a receiving container. The light generating unit includes a printed circuit film and a light source and is disposed adjacent to a side surface of the light-guiding unit. The light source is mounted on the printed circuit film. The receiving container includes a bottom plate, a sidewall, and a gap-regulating portion. The light-guiding unit is disposed at the bottom plate. The sidewall faces a side surface of the light-guiding unit, and is disposed at a peripheral portion of the bottom plate. The gap-regulating portion is formed at the sidewall or the bottom plate, reducing a gap between the light-generating unit and the light-guiding unit.

The gap-regulating portion may be a protrusion protruding from the sidewall and contacting the light source.

Alternatively, the gap-regulating portion may be a guiding boss, which protrudes from an upper portion of the sidewall, and inserted into an opening formed at the printed circuit film.

Alternatively, the gap-regulating portion may be a guiding groove formed at the sidewall.

In still other exemplary embodiments of the present invention, a display apparatus includes a backlight assembly, a receiving container, and a display panel. The backlight assembly includes a light-guiding unit and a light-generating unit having a light source and a printed circuit film. The light-generating unit is disposed adjacent to a side surface of the light-guiding unit. The light source is mounted on the printed circuit film. The receiving container includes a bottom plate, a sidewall, and a gap-regulating portion. The light-guiding unit is disposed at the bottom plate. The sidewall faces a side surface of the light-guiding unit, and is disposed at a peripheral portion of the bottom plate. The gap-regulating portion reduces a gap between the light-generating unit and the light-guiding unit.

In yet other exemplary embodiments of the present invention, a method of reducing a loss of light from a light-generating unit in a backlight assembly includes sliding a light-generating unit including the light source over a gap regulating portion protruding from a sidewall of a receiving container, the sidewall adjacent to a light incident surface of a light guiding unit disposed in the receiving container, and retaining the light-generating unit in position adjacent the light incident surface of the light-guiding unit by the gap regulating portion to reduce a gap between the light-generating unit and the light incident surface.

According to the above, the light-generating unit is spaced apart from the light-guiding unit within a pre-determined gap, thereby increasing light-using efficiency of the backlight assembly and the display apparatus.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
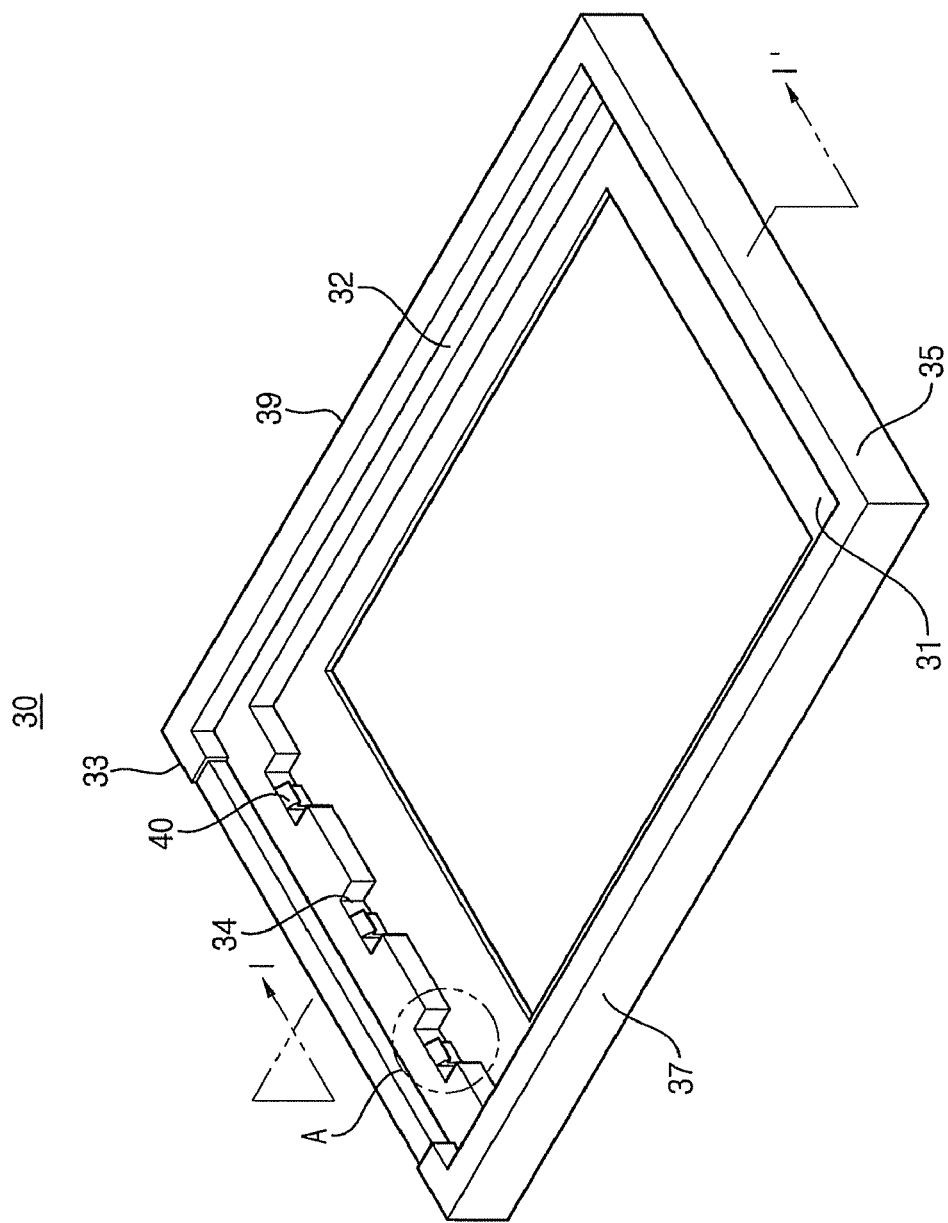
FIG. 1 is a perspective view illustrating an exemplary receiving container for a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained particularly with reference to the accompanying drawings.

Receiving Container for a Display Apparatus

FIG. 1 is a perspective view illustrating an exemplary receiving container for a display apparatus according to an exemplary embodiment of the present invention.

A receiving container 30 for a display apparatus receives a light-guiding unit and a light-generating unit having disposed adjacent to a side surface of the light-guiding unit, as will be further described below.

Referring to FIG. 1, a receiving container 30 includes a bottom plate 31, a first sidewall 33, a second sidewall 35, a third sidewall 37, a fourth sidewall 39 and a gap-regulating portion 40.

The receiving container 30 is sized for receiving the light-guiding unit, having a plate shape, on the bottom plate 31. In order to reduce weight of the receiving container 30, an opening is formed through a center portion of the bottom plate 31. The first, second, third and fourth sidewalls 33, 35, 37 and 39 are disposed at a peripheral portion of the bottom plate 31 to face side surfaces of the light-guiding unit. The first and second sidewalls 33 and 35 face each other. The third and fourth sidewalls 37 and 39 face each other, and connect the first sidewall 33 to the second sidewall 35, respectively. A stepped portion 32 is formed at inner portions of the first, second, third and fourth sidewalls 33, 35, 37 and 39. Thus, each outer side portion of the first, second, third and fourth sidewalls 33, 35, 37 and 39 has a height greater than a height of each inner side portion of the first, second, third and fourth sidewalls 33, 35, 37 and 39 due to the stepped portion 32.

At the first sidewall 33, a recess is formed from an upper portion of the stepped portion 32 along an inner side portion of the first sidewall 33, an upper end portion of the first sidewall 33 and an outer side portion of the first sidewall 33. This recess may be sized for receiving a branch from a printed circuit film of a light generating apparatus and a signal-transmitting film of a display panel, as will be further described below. Additionally, at the stepped portion 32 of the first sidewall 33, receiving grooves 34 are formed such that the receiving grooves 34 face the light-guiding unit to be disposed on the bottom plate 31. In the receiving groove 34, the point light source of the light generating apparatus is disposed such that the point light source faces a side surface of the light-guiding unit. The number of receiving grooves 34 may correspond to the number of point light sources of the light generating apparatus.

Figure 2:
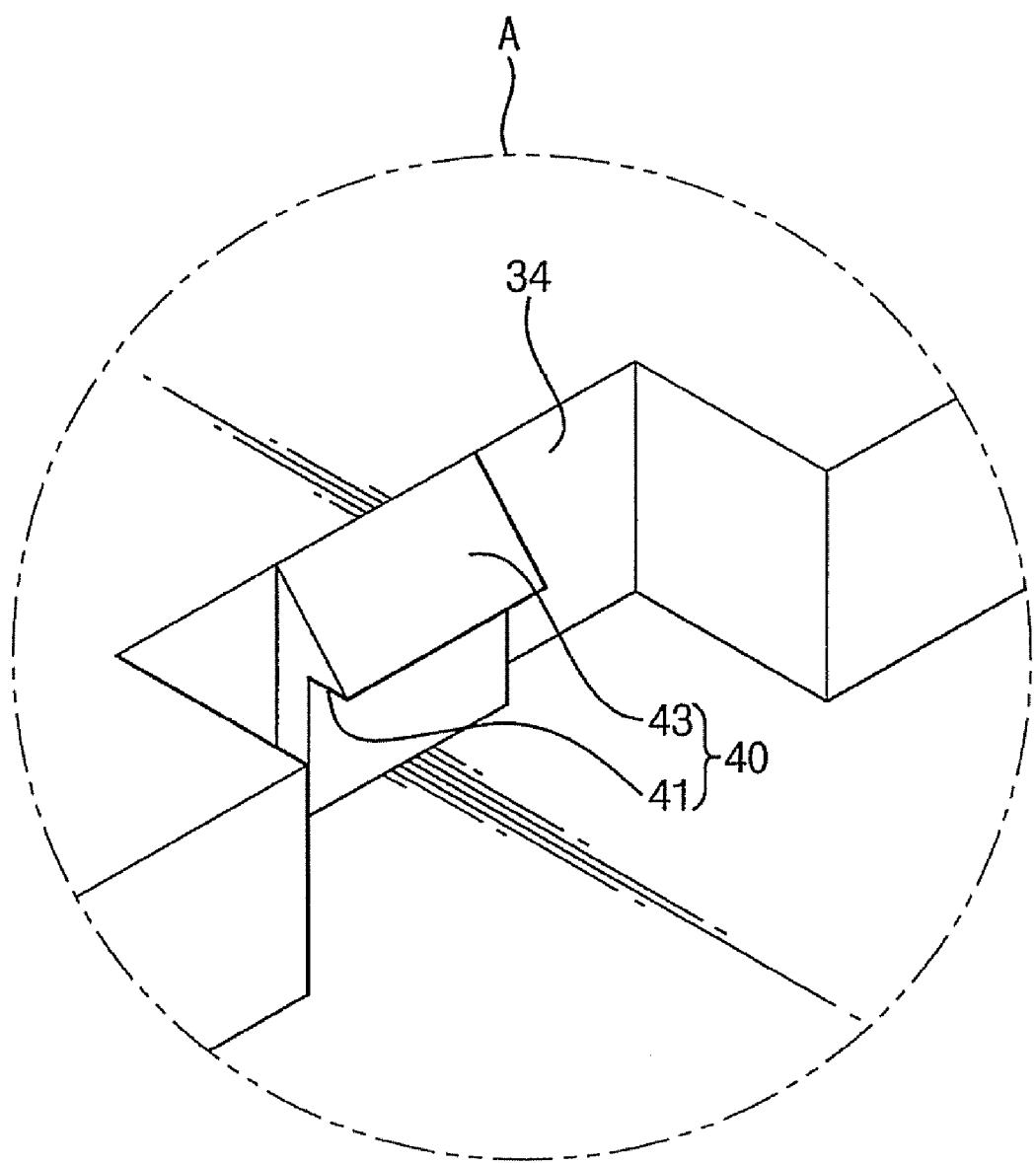
FIG. 2 is an enlarged view illustrating portion 'A' in FIG. 1.
Figure 3:
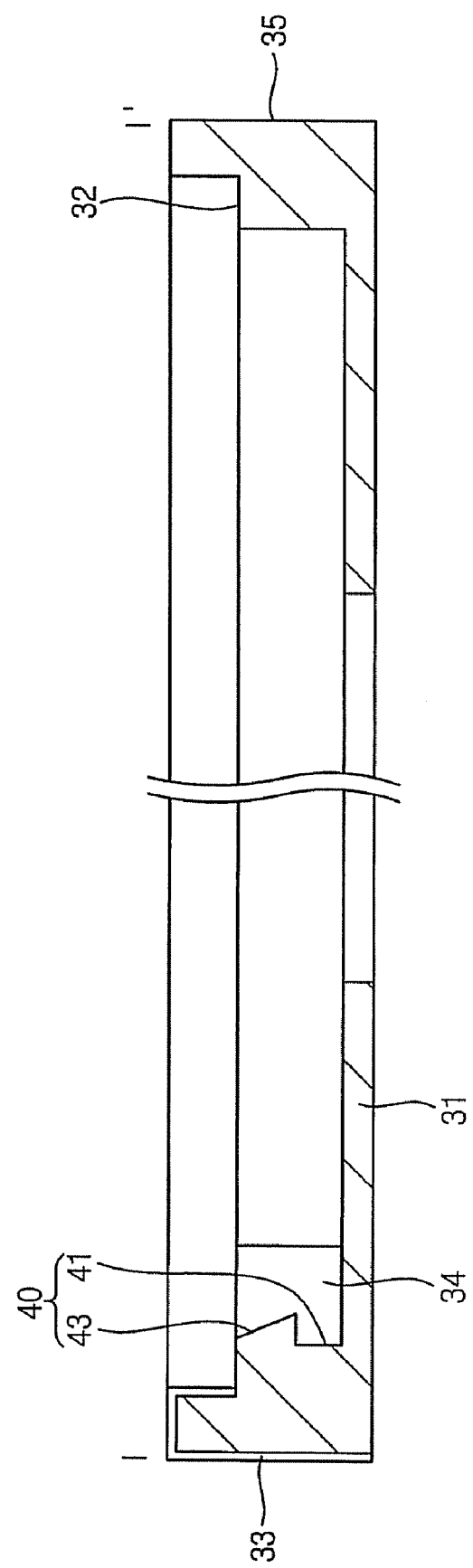
FIG. 3 is a cross-sectional view taken along line I-I' in FIG. 1.

FIG. 2 is an enlarged view illustrating portion 'A' in FIG. 1. FIG. 3 is a cross-sectional view taken along line I-I' in FIG. 1.

Referring to FIGS. 2 and 3, the gap-regulating portion 40 protrudes from a base portion of the receiving groove 34 toward the light-guiding unit. In other words, the gap-regulating portion 40, hereinafter referred to as "protrusion 40" protrudes into the receiving groove 34 towards the opposing second sidewall 35. The protrusion 40 includes a catching jaw surface 41 and a guiding surface 43.

The guiding surface 43 is formed at a slant with respect to the bottom plate 31 such that the light-guiding unit is closer to a lower portion of the guiding surface 43 than to an upper portion of the guiding surface 43. The catching jaw surface 41 is extended from an end of the guiding surface 43 toward the first sidewall 33 to face the bottom plate 31.

The point light source of the light generating apparatus is inserted into the receiving groove 34 from an upper portion of the receiving container 30. The point light source slides along the guiding surface 43, and is stopped at the catching jaw surface 41. The catching jaw surface 41 secures the point light source with respect to a direction perpendicular to the bottom plate 31 and a direction perpendicular to the side surface of the light-guiding unit that faces the first sidewall 33.

The protrusion 40 presses the light-generating unit toward the light-guiding unit, in a process of inserting the point light source into the receiving groove 34. Thus, a gap between the light-generating unit and the light-guiding unit is sustained within a pre-designed value range. The size of the protrusion 40 may be adjusted to suit a particular need.

Figure 4:
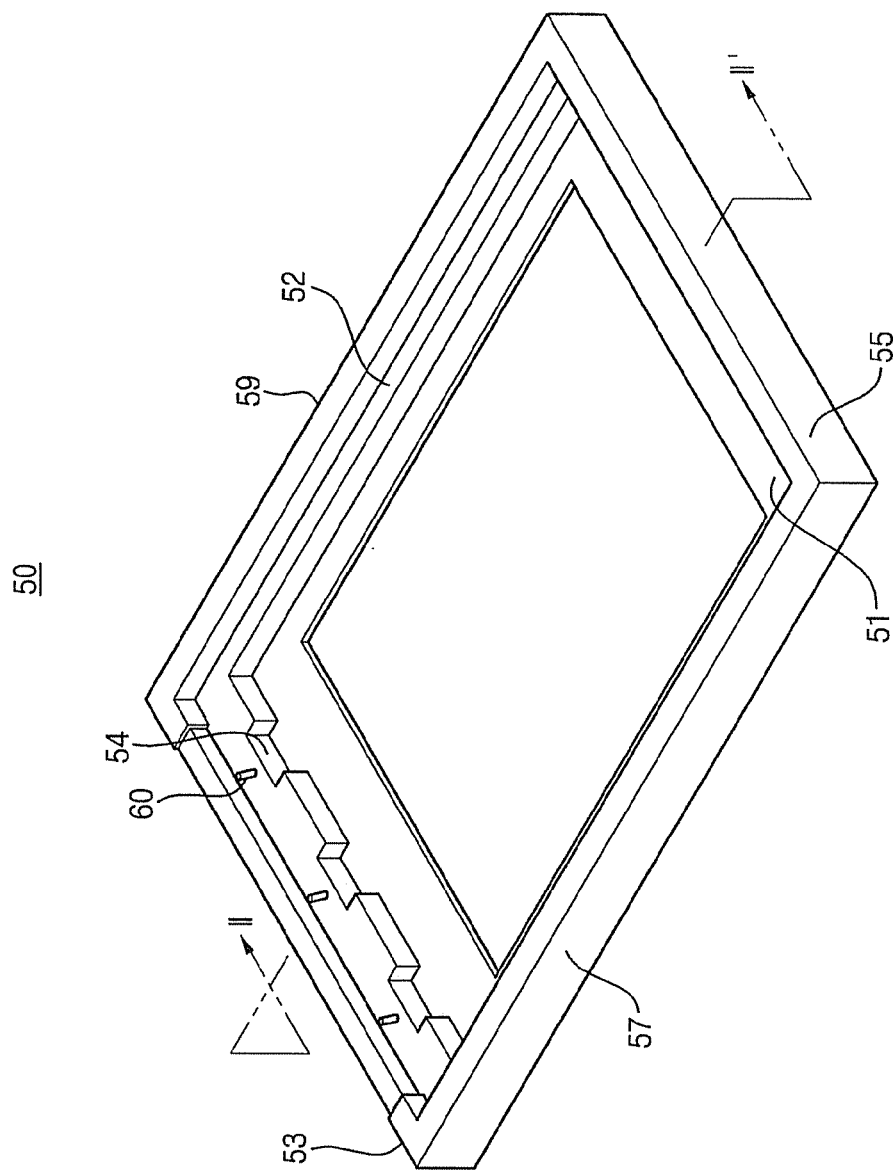
FIG. 4 is a perspective view illustrating an exemplary receiving container for a display apparatus according to another exemplary embodiment of the present invention.
Figure 5:
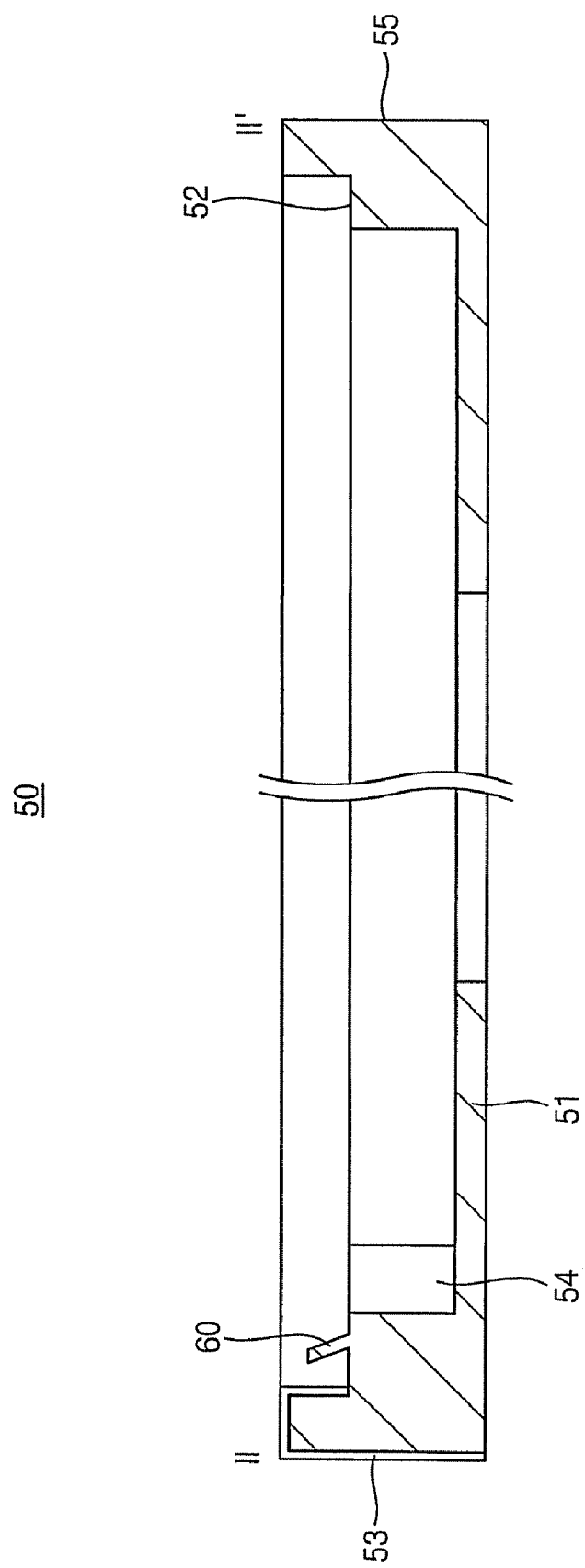
FIG. 5 is a cross-sectional view taken along line II-II' in FIG. 4.

FIG. 4 is a perspective view illustrating an exemplary receiving container for a display apparatus according to another exemplary embodiment of the present invention. FIG. 5 is a cross-sectional view taken along line II-II' in FIG. 4.

Referring to FIGS. 4 and 5, a receiving container 50 includes a bottom plate 51, a first sidewall 53, a second sidewall 55, a third sidewall 57, a fourth sidewall 59 and a gap-regulating portion 60. Receiving grooves 54 are formed at the first sidewall 53.

The receiving container 50 is substantially the same as the receiving container 30 in FIGS. 1 to 3 except for the gap-regulating portion 60.

The gap-regulating portion 60 is not formed at the receiving groove 54, but is formed on an upper surface of a stepped portion 52 corresponding to a first sidewall 53.

The gap-regulating portion 60 is a guiding boss protruding from the stepped portion 52, as illustrated in FIGS. 4 and 5. The gap-regulating portion 60, hereinafter referred to as "guiding boss 60", is formed on the stepped portion 52 between the receiving grooves 54 and the outer side of the first sidewall 53, and protrudes to be slanted toward the first sidewall 53 from the light-guiding unit. The guiding boss 60 may be additionally positioned between adjacent receiving grooves 54.

A hole into which the guiding boss 60 is inserted is formed at the printed circuit film of a light generating apparatus, as will be further described below. The guiding boss 60 is formed at a slant, as described above, rather than perpendicular with respect to the bottom plate 51. In other words, the guiding boss 60 forms an acute angle with an upper surface of the stepped portion 52, the acute angle facing the outer side of the first sidewall 53 and away from the light guiding unit to be disposed on the bottom plate 51. As the guiding boss 60 is inserted into the hole, the printed circuit film moves to a lower end portion of the guiding boss 60 so that the printed circuit film moves toward the light-guiding unit by a pre-determined distance. Therefore, the point light source mounted on the printed circuit film is disposed closer to the light-guiding unit.

Backlight Assembly

Figure 6:
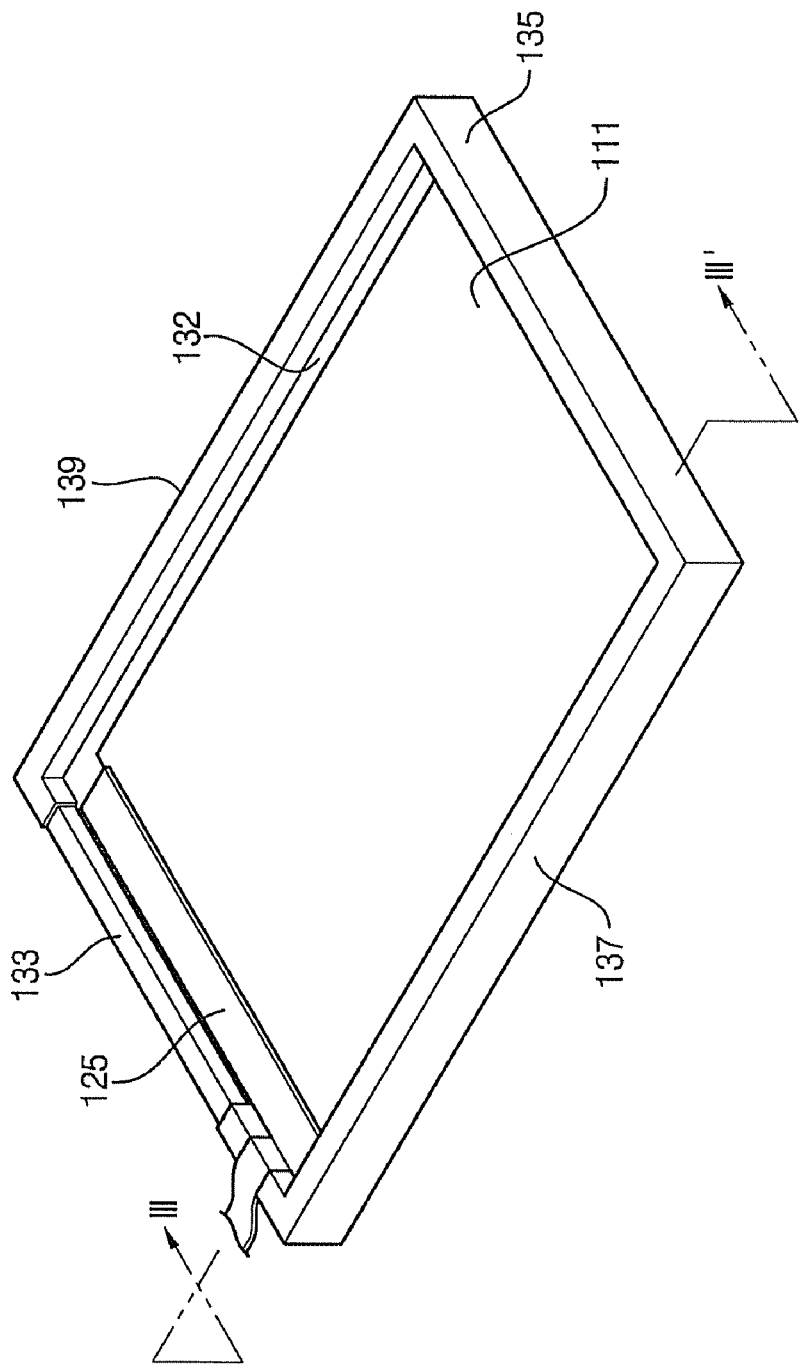
FIG. 6 is a perspective view illustrating an exemplary backlight assembly according to an exemplary embodiment of the present invention.
Figure 7:
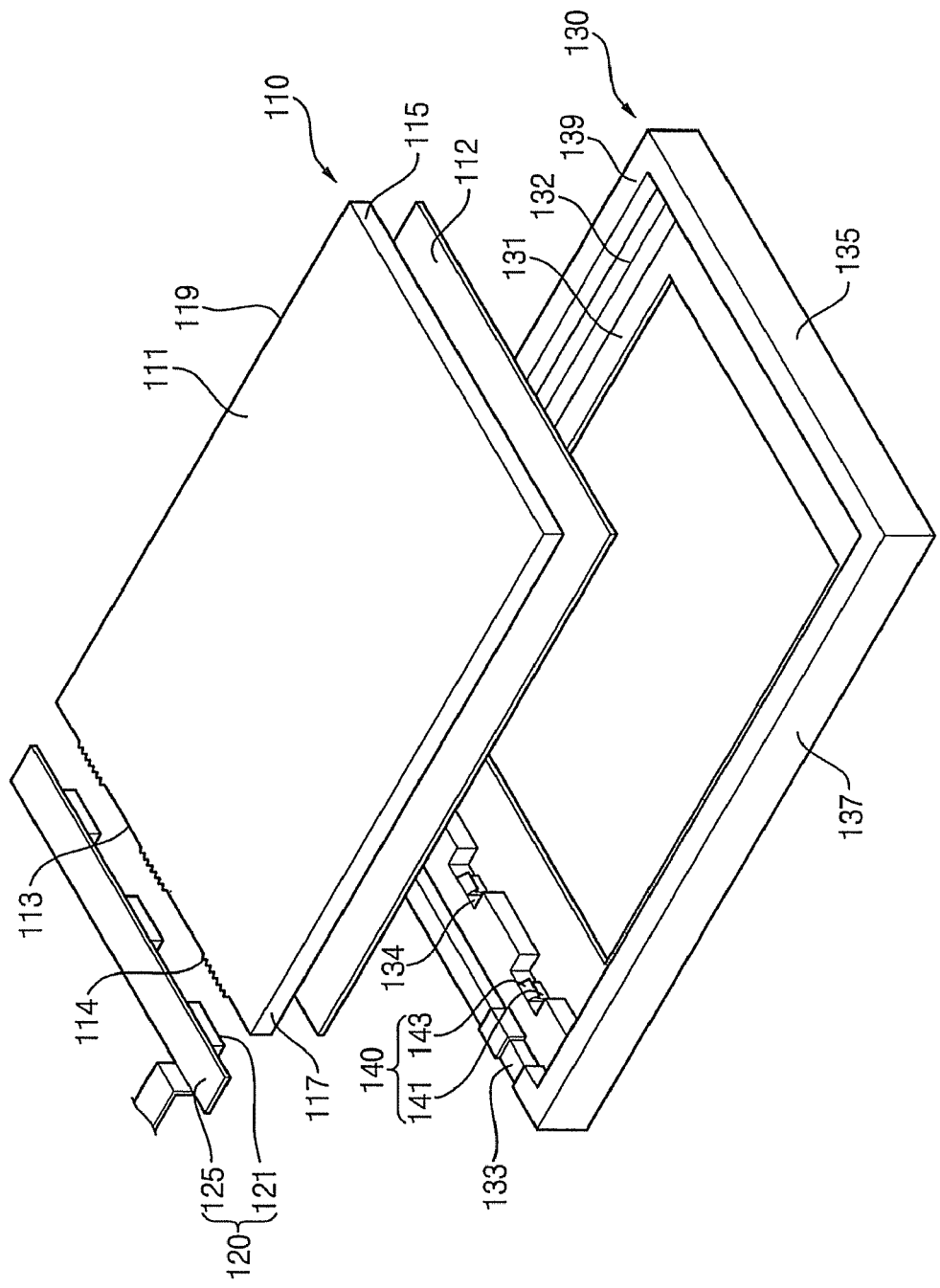
FIG. 7 is an exploded perspective view illustrating the exemplary backlight assembly illustrated in FIG. 6.
Figure 8:
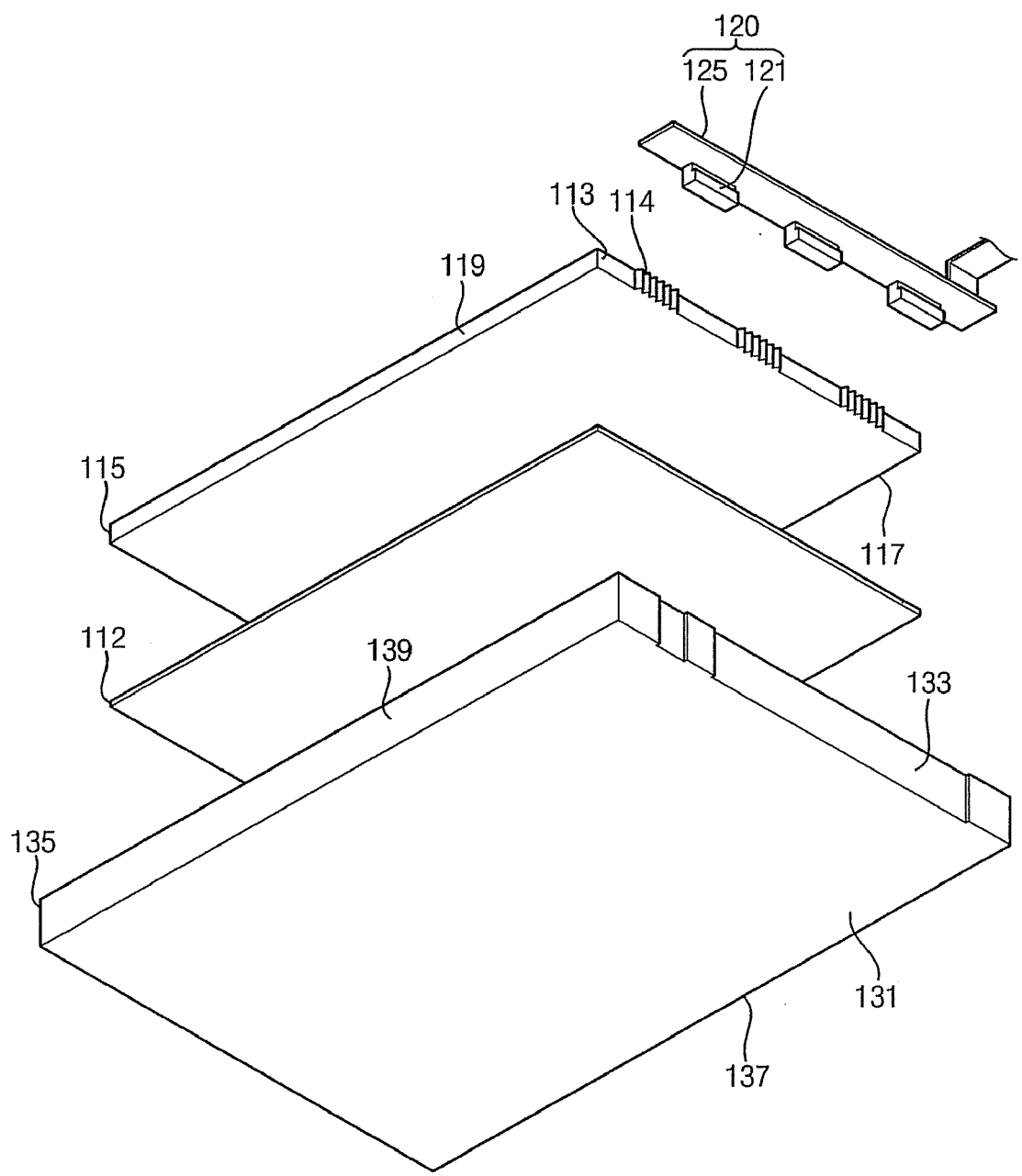
FIG. 8 is another exploded perspective view illustrating the exemplary backlight assembly illustrated in FIG. 7.

FIG. 6 is a perspective view illustrating an exemplary backlight assembly according to an exemplary embodiment of the present invention. FIG. 7 is an exploded perspective view illustrating the exemplary backlight assembly illustrated in FIG. 6. FIG. 8 is another exploded perspective view illustrating the exemplary backlight assembly illustrated in FIG. 7

Referring to FIGS. 6 and 7, a backlight assembly 100 includes a light-guiding unit 110, a light-generating unit 120, and a receiving container 130.

The light-guiding unit 110 guides light generated by the light-generating unit 120 to emit the light from the light exiting surface 111 of the light guiding unit 110. The light-guiding unit 110 may include a light-scattering and light-guiding material, which has high light transmittance, high thermal resistance, high chemical resistance, high mechanical strength, etc. For example, the light-scattering and light-guiding material may include polymethylmethacrylate, polyamide, polypropylene, polyurethane, etc.

The light-guiding unit 110 has a plate-shape, and includes the light-exiting surface 111, a counter surface, facing a bottom plate 131 of the receiving container 130, and first, second, third and fourth side surfaces 113, 115, 117 and 119. The light-exiting surface 111 and the counter surface are disposed opposite to each other. The first, second, third and fourth side surfaces 113, 115, 117 and 119 connect the light-exiting surface 111 to the counter surface. The first side surface 113 and the second side surface 115 are disposed opposite to each other. As illustrated in FIGS. 7 and 8, a light-diffusing pattern 114, which diffuses an incident light, is formed at the first side surface 113. The third side surface 117 and the fourth side surface 119 are disposed opposite to each other and connect the first side surface 113 to the second side surface 115.

Light that enters the light-guiding unit 110 through the first side surface 113, repeats reflection and diffusion inside the light-guiding unit 110 to be propagated to the second side surface 115. In case that a condition for exiting is satisfied, the guided light exits from the light-guiding unit 110 through the light-exiting surface 111. A reflecting plate 112 may be included between the counter surface of the light-guiding unit 110 and the bottom plate 131 for reflecting light exiting the counter surface back into the light-guiding unit 110. Alternatively, a reflecting material may be coated on the counter surface of the light-guiding unit 110.

For example, the light-guiding unit 110 may have a wedge-shape, such that a thickness of the light-guiding unit 110 increases along a direction from the first side surface 113 to the second side surface 115. Also for example, the counter surface of the light-guiding unit 110 may include ridges, grooves, prisms, or protrusions for encouraging direction of light towards the light exiting surface 111.

The light-generating unit 120 provides the light-guiding unit 110 with light. The light-generating unit 120 may include a point light source 121 and a printed circuit film 125. The point light source 121 may include a light-emitting diode ("LED") that has a small volume and a light weight. The point light source 121 includes a light-generating part and an outer case. The light-generating part is built within the outer case.

The printed circuit film 125 extends in a longitudinal direction of the first side surface 113 and may be disposed on a stepped portion 132 of the first sidewall 133. A portion of the printed circuit film 125 may overlap with an edge of the light guiding unit 110. A branch protrudes from a side end portion of the printed circuit film 125 to be connected to an external power supply part (not shown). The branch may be received on a recess formed on an uppermost surface of the first sidewall 133. The point light source 121 is mounted on the printed circuit film 125, and an electrode terminal of the light-generating part of the point light source 121 is electrically connected to a conductive pattern formed at the printed circuit film 125. The printed circuit film 125 receives electric power by the external power supply part (not shown) to apply driving current to the point light source 121. The point light source 121 that receives the driving current emits light that has a high straightness. In the illustrated embodiment, three point light sources 121 are mounted on a lower surface of the printed circuit film 125, and are disposed to face the light-diffusing pattern 114 of the first side surface 113. While three point light sources 121 are shown, alternative numbers of point light sources 121 would also be within the scope of these embodiments. Alternatively, the printed circuit film 125 may be disposed between the point light source 121 and the first sidewall 133.

The receiving container 130 receives the light-guiding unit 110 and the light-generating unit 120. The receiving container 130 includes a bottom plate 131, a first sidewall 133, a second sidewall 135, a third sidewall 137, a fourth sidewall 139 and a gap-regulating portion 140. A stepped portion 132 may be formed at inner portions of the first, second, third, and fourth sidewalls 133, 135, 137, and 139. The gap-regulating portion 140 in this embodiment is a protrusion, and will hereinafter be referred to as "protrusion 140". The receiving container 130 is substantially the same as the receiving container 30 illustrated in FIGS. 1 to 3.

Figure 9:
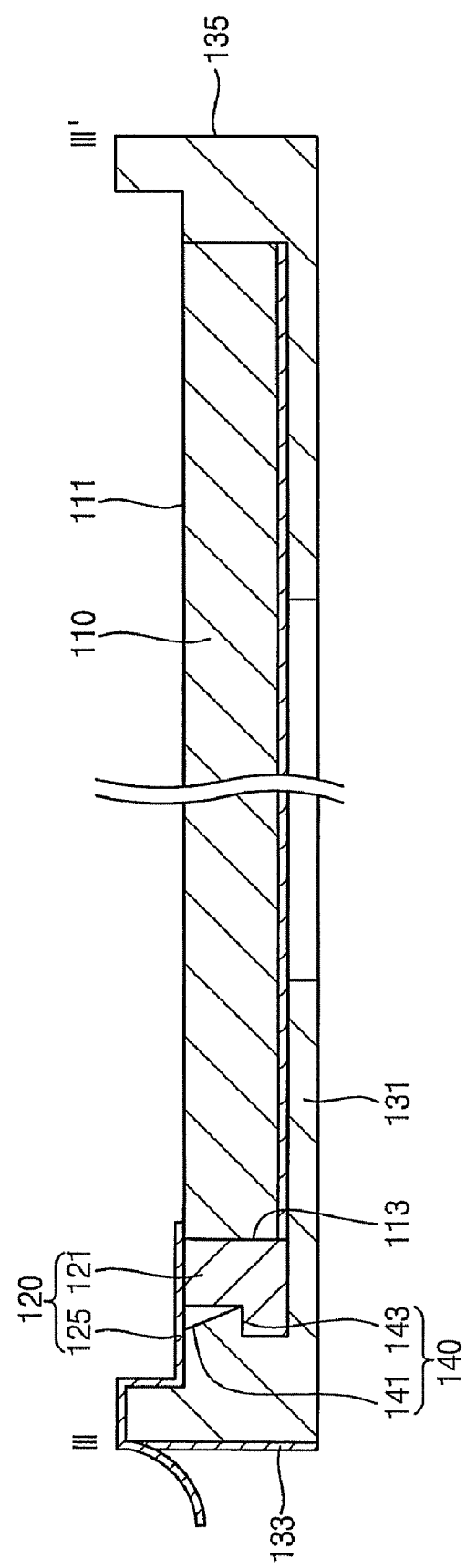
FIG. 9 is a cross-sectional view taken along line III-III' in FIG. 6.

FIG. 9 is a cross-sectional view taken along line III-III' in FIG. 6.

Referring to FIGS. 6 to 9, the point light source 121 is received in the receiving groove 134 formed at the first sidewall 133. The point light source 121 slides along a guiding surface 143 of the protrusion 140, and is caught by a catching jaw surface 141 of the protrusion 140. The protrusion 140 presses the point light source 121 toward the light-guiding unit 110. Thus, the point light source 121 is forced to be closer to the first side surface 113 of the light-guiding unit 110.

Figure 10:
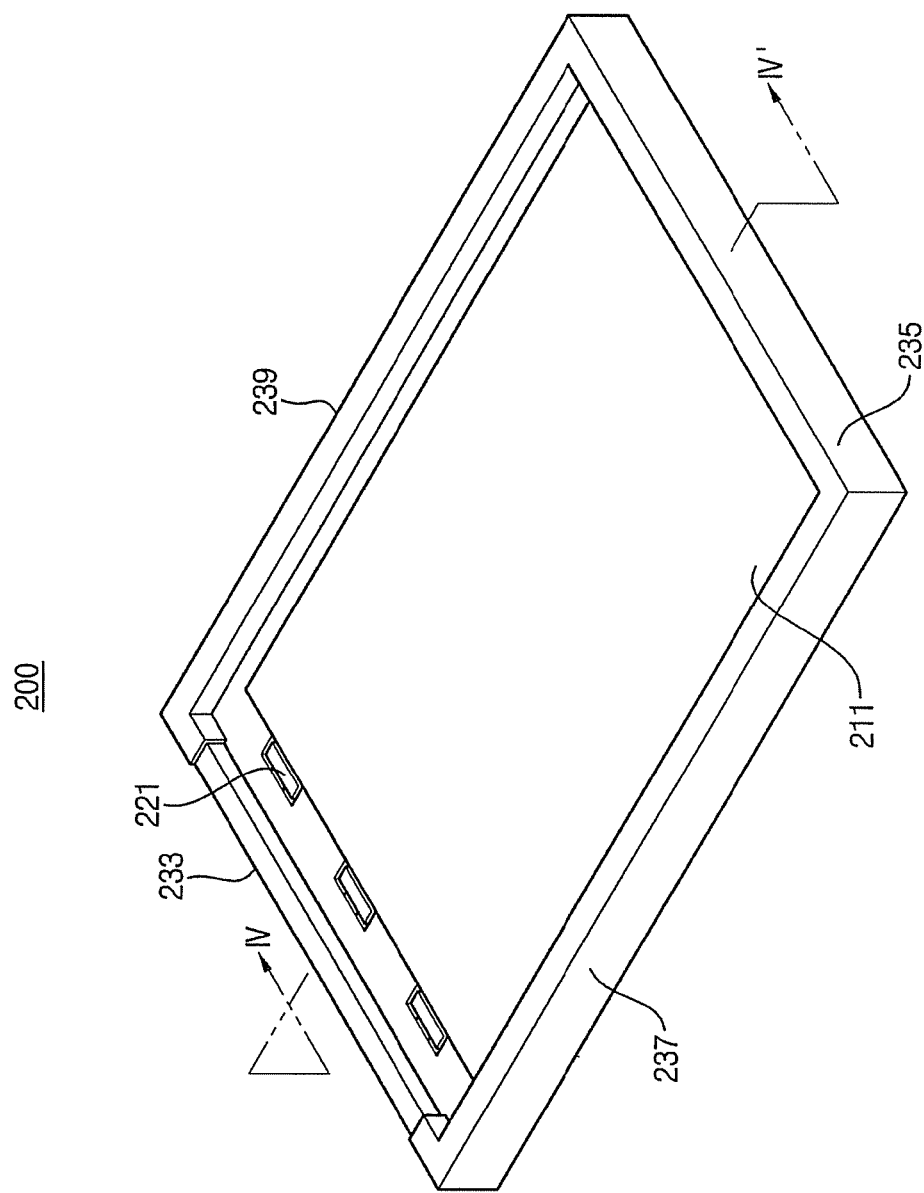
FIG. 10 is a perspective view illustrating an exemplary backlight assembly according to another exemplary embodiment of the present invention.
Figure 11:
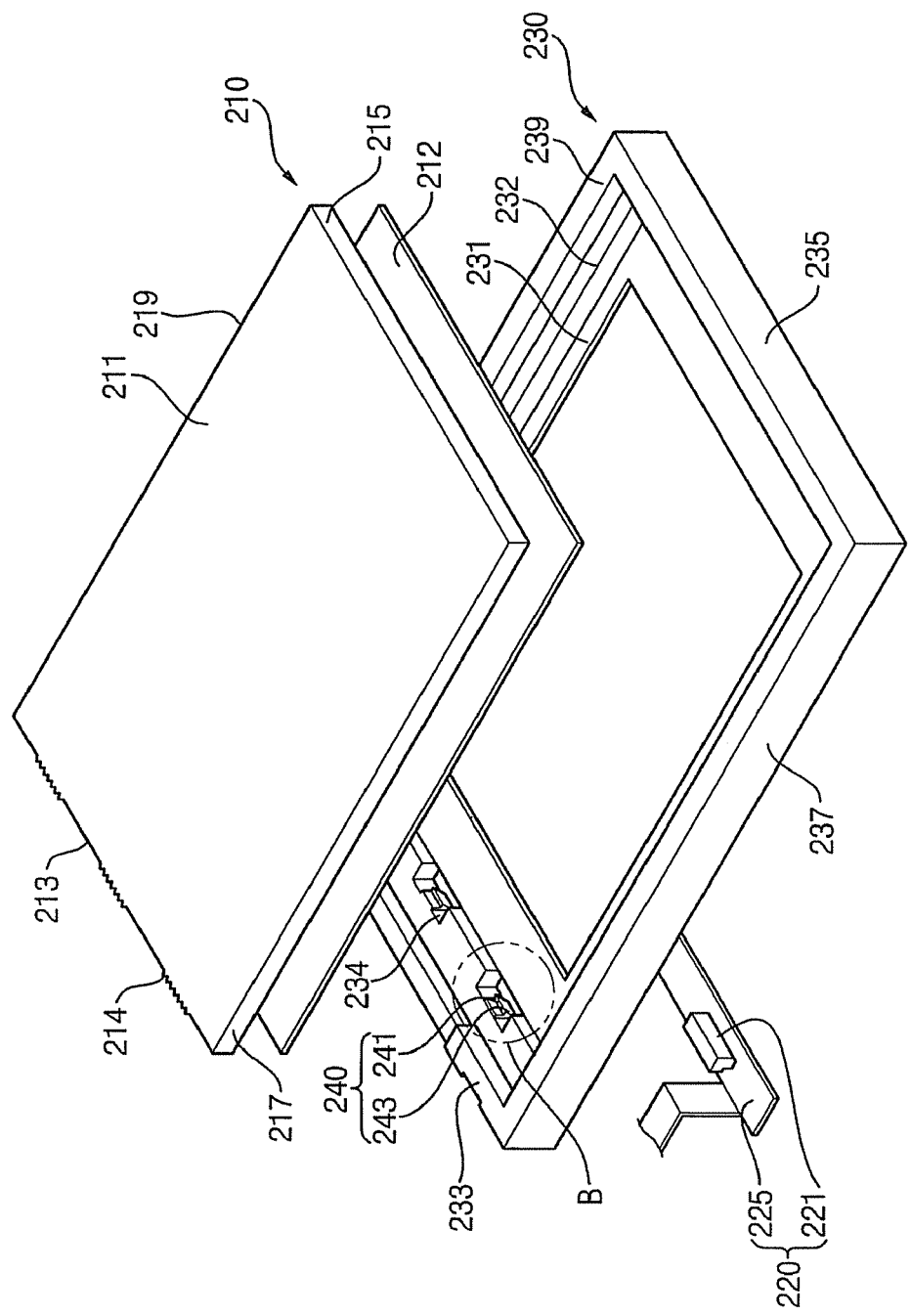
FIG. 11 is an exploded perspective view illustrating the exemplary backlight assembly illustrated in FIG. 10.

FIG. 10 is a perspective view illustrating an exemplary backlight assembly according to another exemplary embodiment of the present invention. FIG. 11 is an exploded perspective view illustrating the exemplary backlight assembly illustrated in FIG. 10.

Referring to FIGS. 10 and 11, a backlight assembly 200 includes a light-guiding unit 210, a light-generating unit 220, and a receiving container 230. The backlight assembly 200 is substantially the same as the backlight assembly 100 illustrated in FIGS. 6 through 9, except for the receiving container 230 and the light-generating unit 220.

The receiving container 230 includes a bottom plate 231, a first sidewall 233, a second sidewall 235, a third sidewall 237, and a fourth sidewall 239 and a gap-regulating portion 240.

The light-guiding unit 210 is disposed on the bottom plate 231. In order to reduce weight of the receiving container 230, an opening is formed at a center portion of the bottom plate 231. The first, second, third and fourth sidewalls 233, 235, 237 and 239 are disposed in a peripheral portion of the bottom plate 231 to face first, second, third and fourth side surfaces 213, 215, 217 and 219 of the light-guiding unit 210, respectively. The light-guiding unit 210 includes a light exiting surface 211 and an opposing counter surface. The first side surface 213 may include light diffusing patterns 214 facing the first sidewall 233. A reflecting plate 212 may be disposed between the counter surface and the bottom plate 231. The first and the second sidewalls 233 and 235 are disposed opposite to each other. The third and the fourth sidewalls 237 and 239 are disposed opposite to each other, and connect the first sidewall 233 to the second sidewall 235.

At the first sidewall 233, a recess is formed from an upper portion of the stepped portion 232 along an inner side portion of the first sidewall 233, an upper end portion of the first sidewall 233 and an outer side portion of the first sidewall 233, such as for receiving a signal-transmitting film of a display panel, as will be further described below. A recess may be further formed along a lower end portion of the first sidewall 233 and an outer side portion of the first sidewall 233, such as for receiving a branch portion of the printed circuit film 225. Additionally, at the stepped portion 232 of the first sidewall 233, receiving grooves 234 are formed to face the first side surface 213 of the light-guiding unit 210. Openings 236, as can be seen in FIG. 12, corresponding to each of the receiving grooves 234 are formed at the bottom plate 231.

Figure 12:
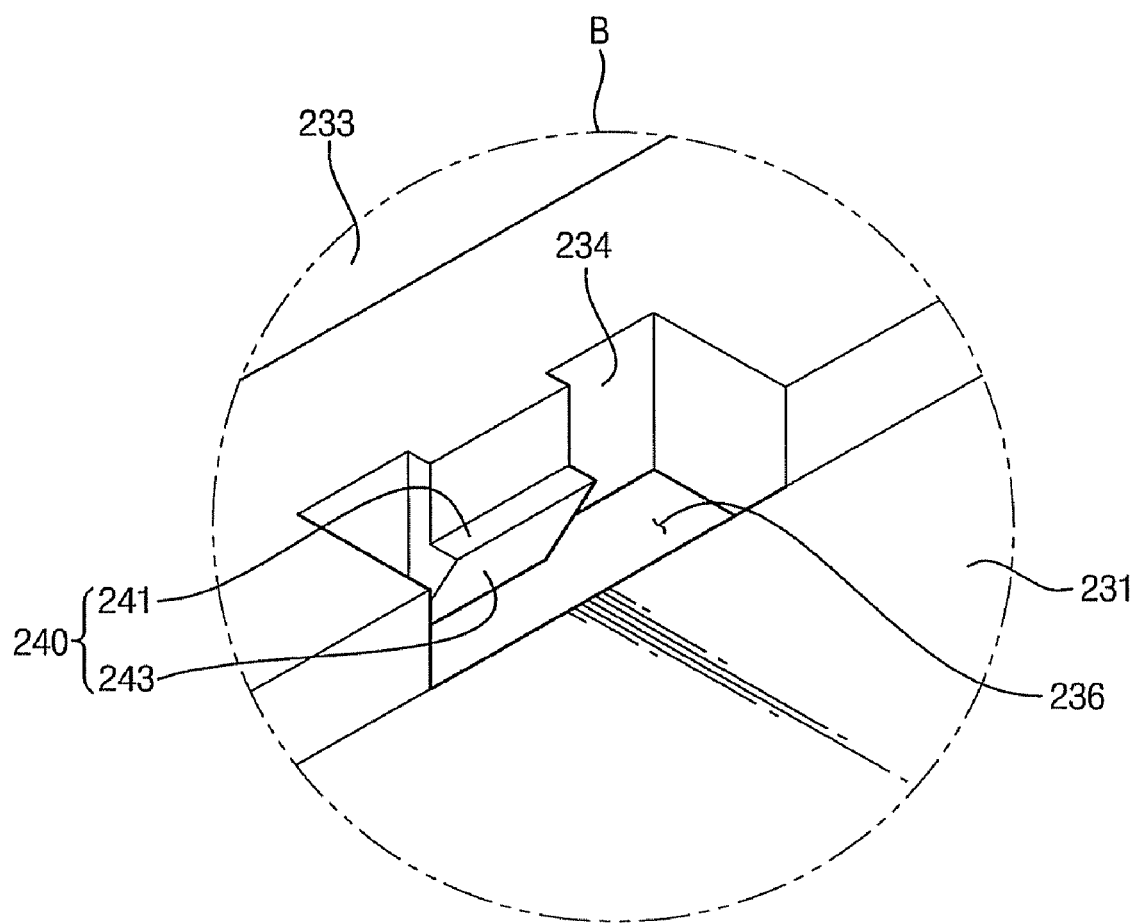
FIG. 12 is an enlarged view illustrating portion 'B' in FIG. 11.
Figure 13:
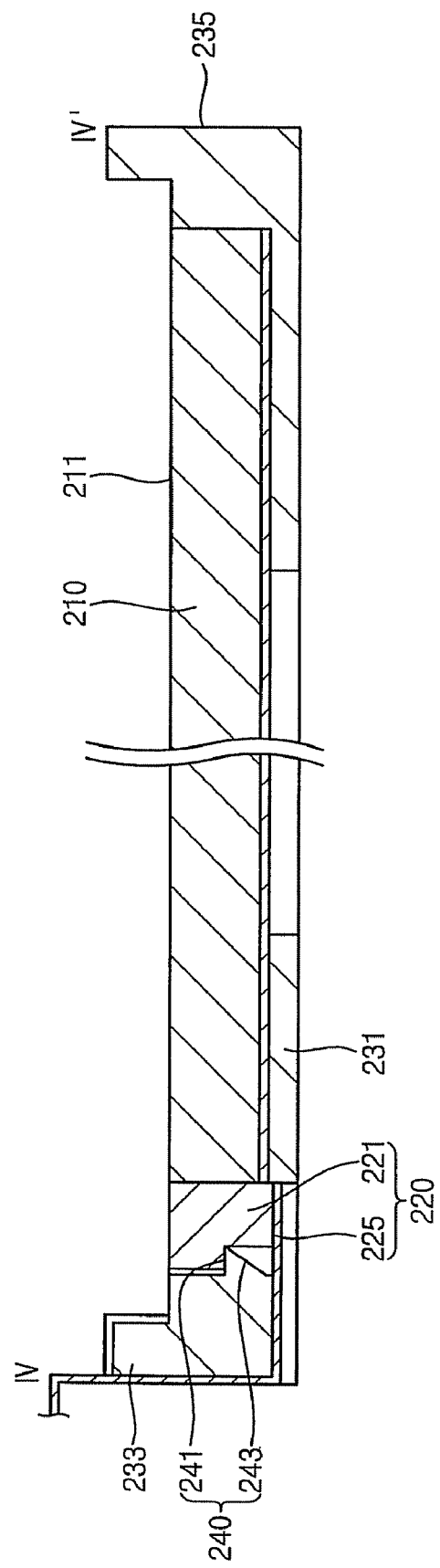
FIG. 13 is a cross-sectional view taken along line IV-IV' in FIG. 10.

FIG. 12 is an enlarged view illustrating portion 'B' in FIG. 11. FIG. 13 is a cross-sectional view taken along line IV-IV' in FIG. 10.

Referring to FIGS. 12 and 13, the gap-regulating portion 240 is formed at a base portion of each receiving groove 234. The gap-regulating portion 240 protrudes from the base portion of each receiving groove 234, and is hereinafter referred to as "protrusion 240". The protrusion 240 includes a catching jaw surface 241 and a guiding surface 243.

The guiding surface 243 is formed at a slant with respect to the bottom plate 231 such that the light-guiding unit 210 is closer to an upper portion of the guiding surface 243 than to a lower portion of the guiding surface 243. The catching jaw surface 241 is extended from an upper end portion of the guiding surface 243 toward the first sidewall 233.

The light-generating unit 220 provides the light-guiding unit 210 with light. The light-generating unit 220 includes a point light source 221, such as an LED, and a printed circuit film 225.

The printed circuit film 225 extends in a longitudinal direction of the first sidewall 233. A branch protrudes from a side end portion of the printed circuit film 225 to be connected to an external power supply part (not shown). The point light source 221 is mounted on the printed circuit film 225, and an electrode terminal of a light-generating part of the point light source 221 is electrically connected to a conductive pattern formed at the printed circuit film 225. The printed circuit film 225 is disposed adjacent a lower surface of the bottom plate 231 so that the point light source 221 is disposed at the receiving groove 234 through an opening 236 that is formed through the bottom plate 231. Alternatively, the printed circuit film 225 may be disposed between the first sidewall 233 and the point light source 221.

During a process of assembling the backlight assembly 200, the point light source 221 slides along the guiding surface 243, and is stopped at the catching jaw surface 241. The catching jaw surface 241 secures the point light source 221 with respect to a direction perpendicular to the bottom plate 231 and a direction perpendicular to the first side surface 213.

The protrusion 240 presses the light-generating unit 220 toward the first side surface 213 in a process of inserting the point light source 221 into the receiving groove 234. Thus, a gap between the light-generating unit 220 and the first side surface 213 is sustained within a pre-designed value range.

Figure 14:
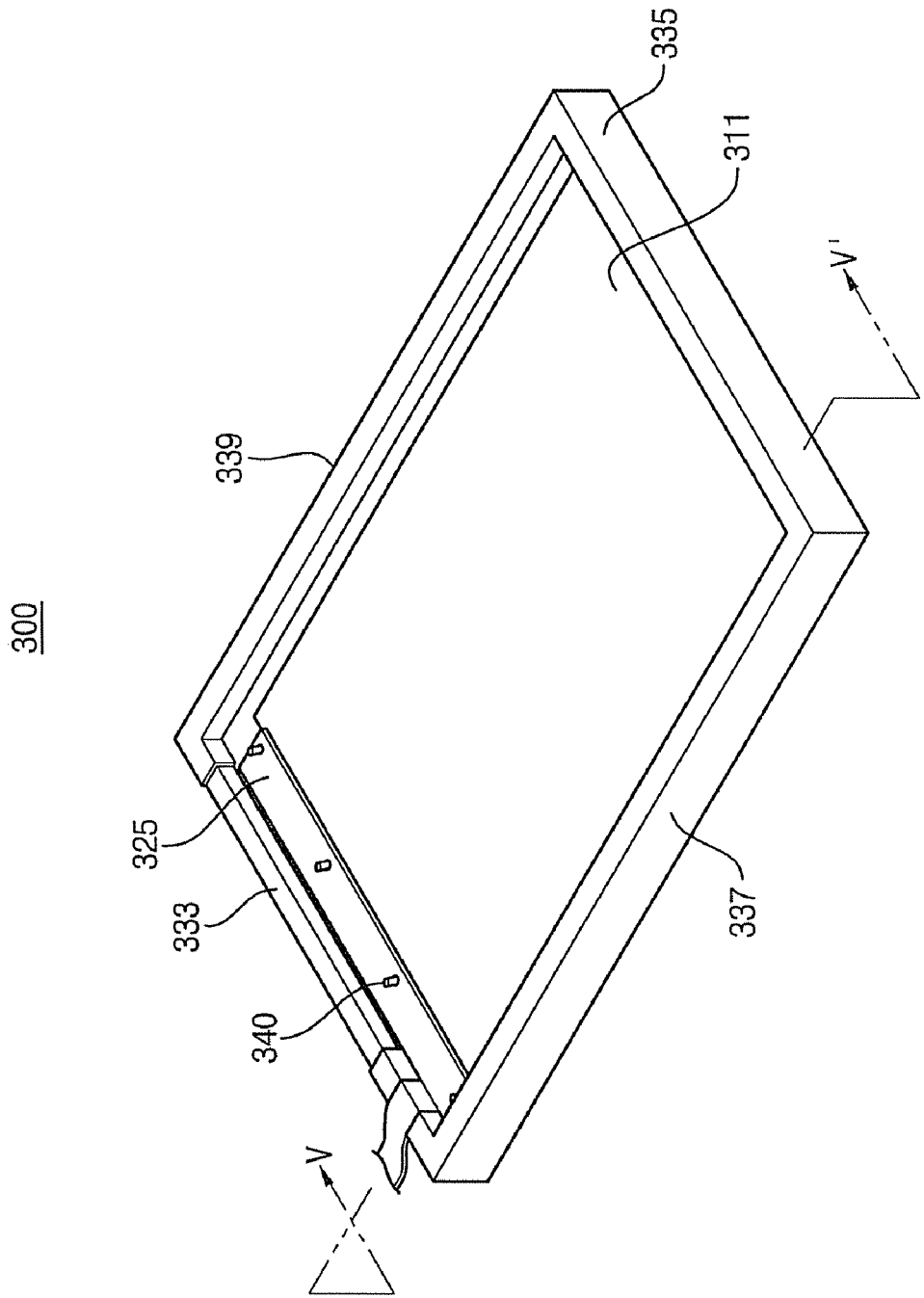
FIG. 14 is a perspective view illustrating an exemplary backlight assembly according to still another exemplary embodiment of the present invention.
Figure 15:
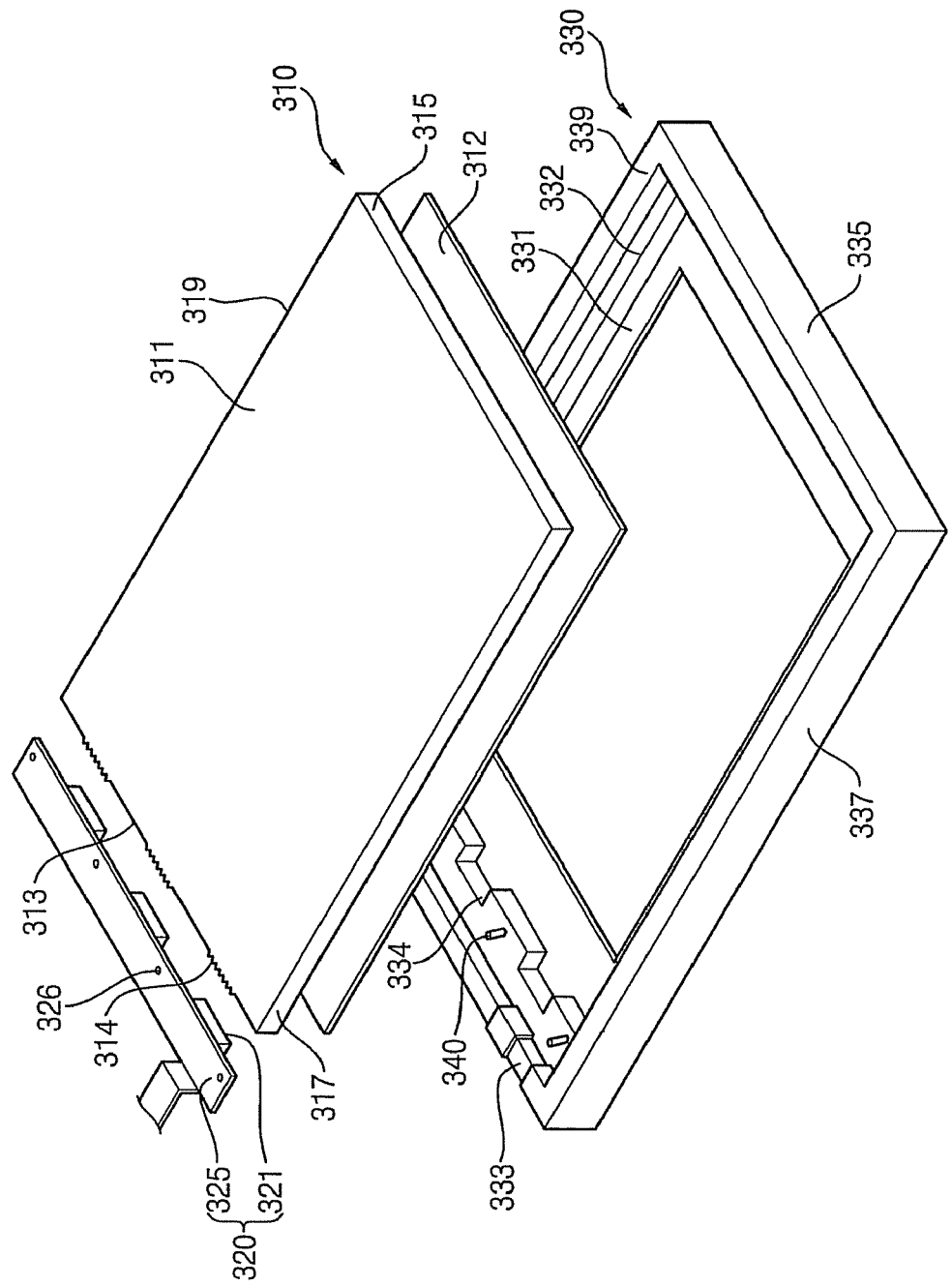
FIG. 15 is an exploded perspective view illustrating the exemplary backlight assembly illustrated in FIG. 14.

FIG. 14 is a perspective view illustrating an exemplary backlight assembly according to still another exemplary embodiment of the present invention. FIG. 15 is an exploded perspective view illustrating the exemplary backlight assembly illustrated in FIG. 14.

Referring to FIGS. 14 and 15, a backlight assembly 300 includes a light-guiding unit 310, a light-generating unit 320, and a receiving container 330. The backlight assembly 300 is substantially the same as the backlight assembly 100 illustrated in FIGS. 6 to 9, except for the receiving container 330 and the light-generating unit 320.

The light-guiding unit 310 is disposed on a bottom plate 331 of the receiving container 330, and includes first, second, third, and fourth side surfaces 313, 315, 317, and 319, a light exiting surface 311, and a counter surface opposite the light exiting surface 311. The first side surface 313 includes light diffusing patterns 314 facing receiving grooves of the first sidewall 333 for diffusing light from the light-generating unit 320. A reflecting plate 312 may be disposed between the bottom plate 331 and the light-guiding unit 310.

The light-generating unit 320 includes a printed circuit film 325 and a point light source 321, such as an LED. The light-generating unit 320 is substantially the same as the light-generating unit 120 illustrated in FIG. 7, except for the printed circuit film 325.

Three point light sources 321 are disposed in a row at a lower surface of the printed circuit film 325, although an alternate number of point light sources 321 may be employed. Holes 326 are formed at the printed circuit film 325 such that the holes 326 are disposed between the locations of the point light sources 321 on the printed circuit film 325.

The receiving container 330 is substantially the same as the receiving container 50 illustrated in FIGS. 4 and 5.

Figure 16:
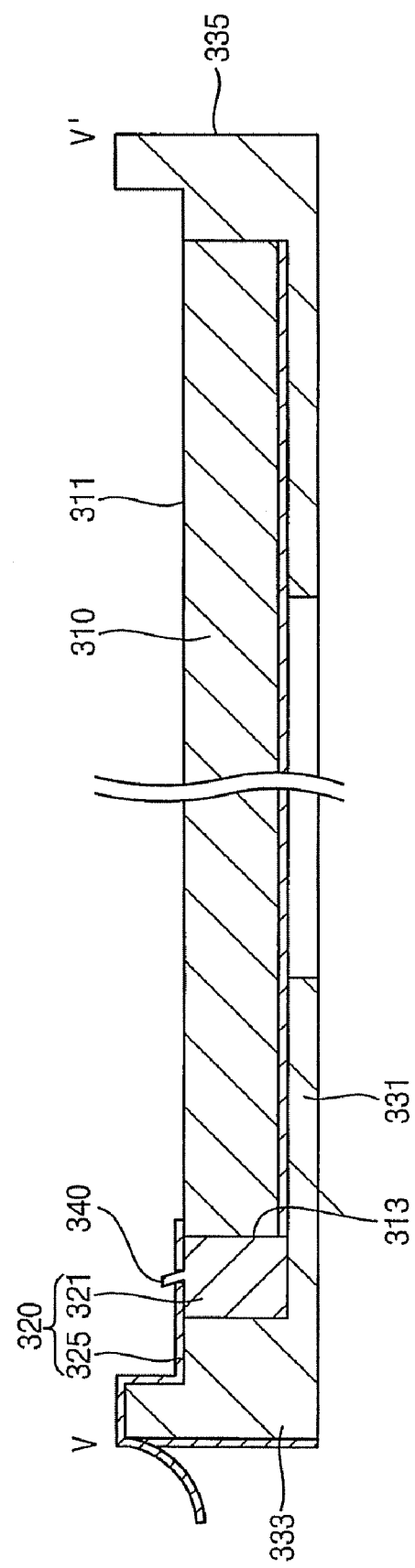
FIG. 16 is a cross-sectional view taken along line V-V' in FIG. 14.
Figure 17A:
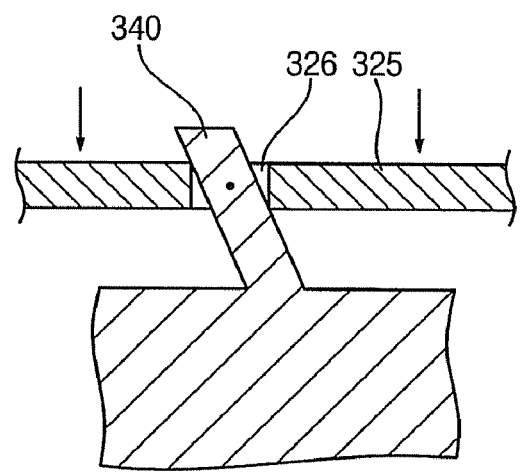
FIGS. 17A to 17C are cross-sectional views illustrating an exemplary printed circuit film coupled to an exemplary guiding boss.
Figure 17B:
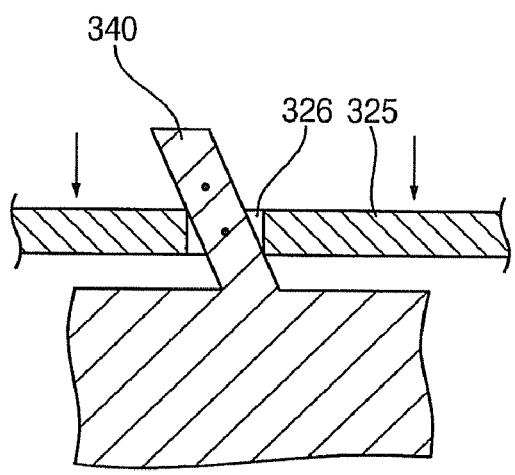
Figure 17C:
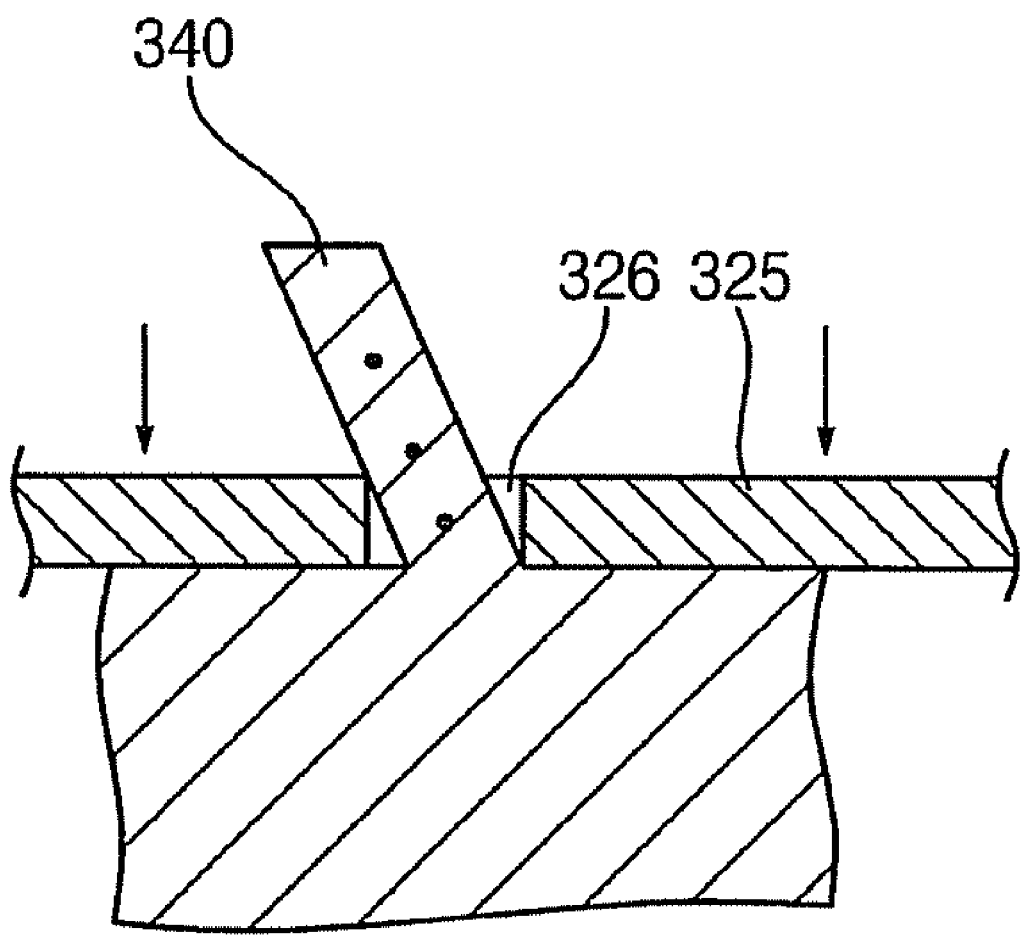

FIG. 16 is a cross-sectional view taken along line V-V' in FIG. 14. FIGS. 17A to 17C are cross-sectional views illustrating an exemplary printed circuit film coupled to an exemplary guiding boss.

Referring to FIG. 16, the point light source 321 mounted on a lower surface of the printed circuit film 325 is disposed in the receiving groove 334 of the receiving container 330. A guiding boss 340 formed at the receiving container 330 is inserted into the hole 326 formed at the printed circuit film 325. The stepped portion 332 is formed at inner portions of the first, second, third and fourth sidewalls 333, 335, 337 and 339. The guiding boss 340 protrudes from a stepped portion 332 such that the guiding boss 340 is disposed between adjacent receiving grooves 334. The guiding boss 340 is formed at a slant toward the first sidewall 333.

Thus, as illustrated in FIGS. 17A to 17C, as the printed circuited film 325 moves to a lower portion of the guiding boss 340, the printed circuited film 325 moves toward the first side surface 313 of the light-guiding unit 310. Therefore, the light-generating unit 320 is disposed closer to the light-guiding unit 310.

Figure 18:
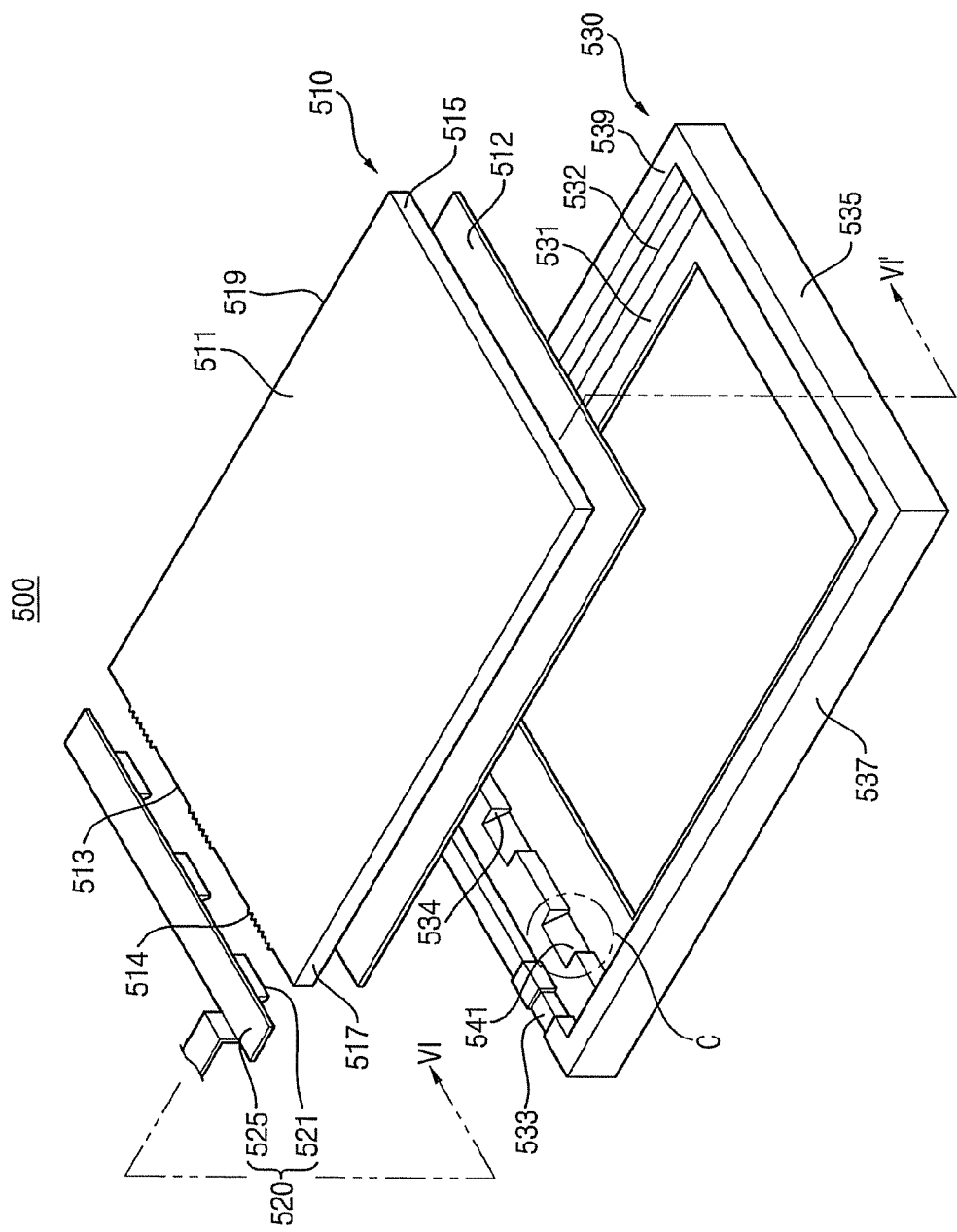
FIG. 18 is an exploded perspective view illustrating an exemplary backlight assembly according to still another exemplary embodiment of the present invention.
Figure 19:
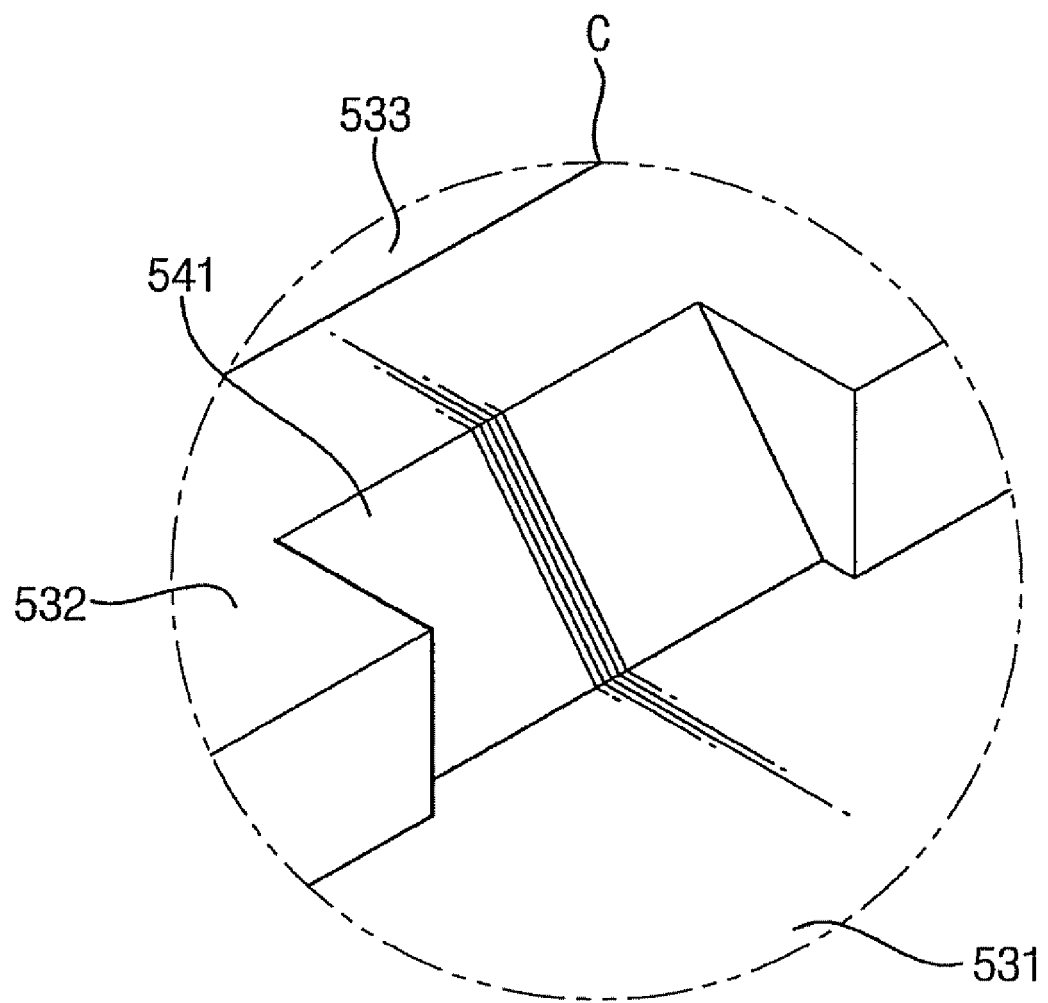
FIG. 19 is an enlarged view illustrating portion 'C' in FIG. 18.

FIG. 18 is an exploded perspective view illustrating an exemplary backlight assembly according to still another exemplary embodiment of the present invention. FIG. 19 is an enlarged view illustrating portion 'C' illustrated in FIG. 18.

Referring to FIGS. 18 and 19, a backlight assembly 500 includes a light-guiding unit 510, a light-generating unit 520, and a receiving container 530. The backlight assembly 500 is substantially the same as the backlight assembly 100 illustrated in FIGS. 6 to 9, except for the receiving container 530 and the light-generating unit 520.

The receiving container 530 includes a bottom plate 531, a first sidewall 533, a second sidewall 535, a third sidewall 537, a fourth sidewall 539 and a gap-regulating portion 534.

The light-guiding unit 510 is disposed at the bottom plate 531. Light exits the light-guiding unit 510 through a light exiting surface 511. A reflective plate may be disposed between the bottom plate 531 of the receiving container 530 and a counter surface of the light-guiding unit 510. The first, second, third and fourth sidewalls 533, 535, 537 and 539 of the receiving container 530 are disposed at a peripheral portion of the bottom plate 531 to face first, second, third and fourth side surfaces 513, 515, 517 and 519 of the light-guiding unit 510, respectively. The first side surface 513 may include light diffusing patterns 514. A stepped portion 532 is formed at inner portions of the first, second, third and fourth sidewalls 533, 535, 537 and 539. The gap-regulating portion 534 is formed at a stepped portion 532 corresponding to the first sidewall 533.

In this example, the gap-regulating portion 534 is a guiding groove formed at the stepped portion 532, and the gap-regulating portion 534 is hereinafter referred to as a "guiding groove 534". The guiding groove 534, as illustrated in FIG. 19, is formed to face the first side surface 513 of the light-guiding unit 510. A base face 541 of the guiding groove 534 is slanted with respect to the bottom plate 531, such that the first side surface 513 of the light-guiding unit 510 is closer to a lower portion of the base face 541 than to an upper portion of the base face 541.

Figure 20:
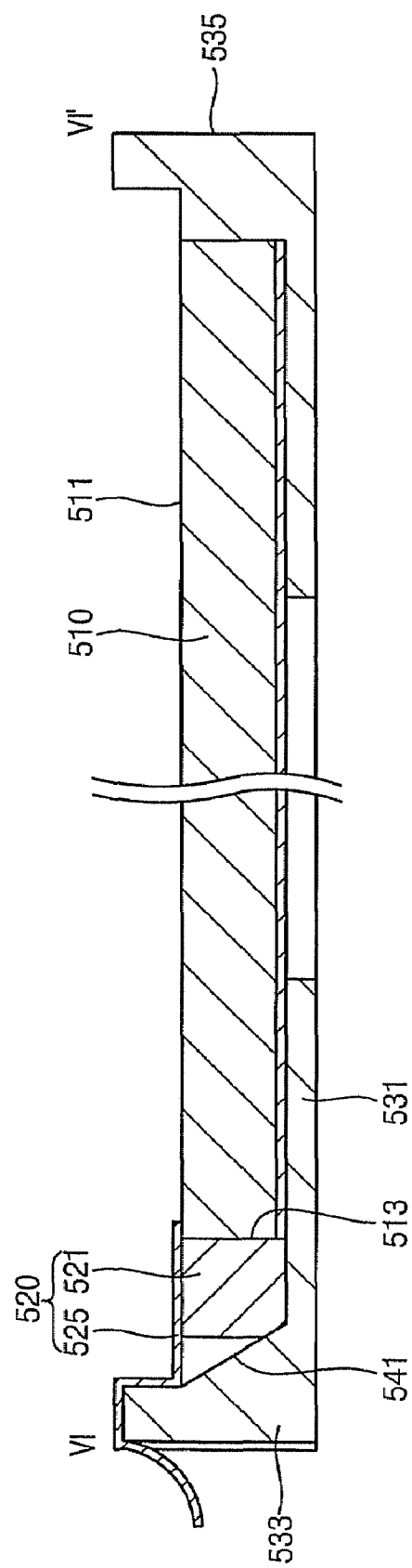
FIG. 20 is a cross-sectional view taken along line VI-VI' in FIG. 18.
Figure 21A:
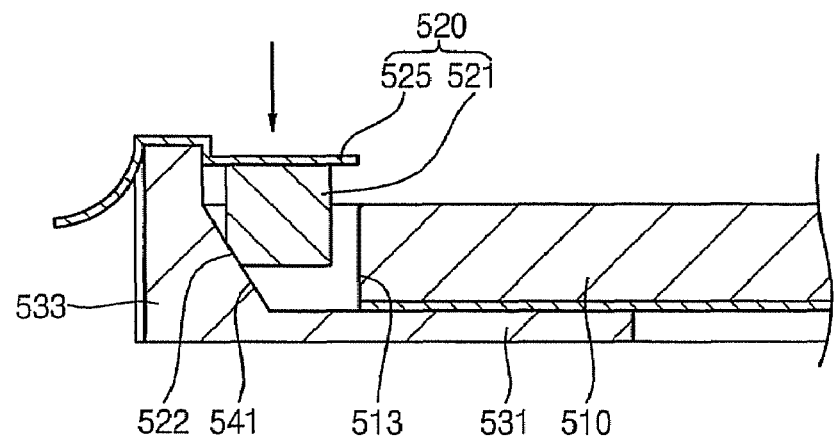
FIGS. 21A and 21B are cross-sectional views illustrating exemplary point light sources received in an exemplary guiding groove.
Figure 21B:
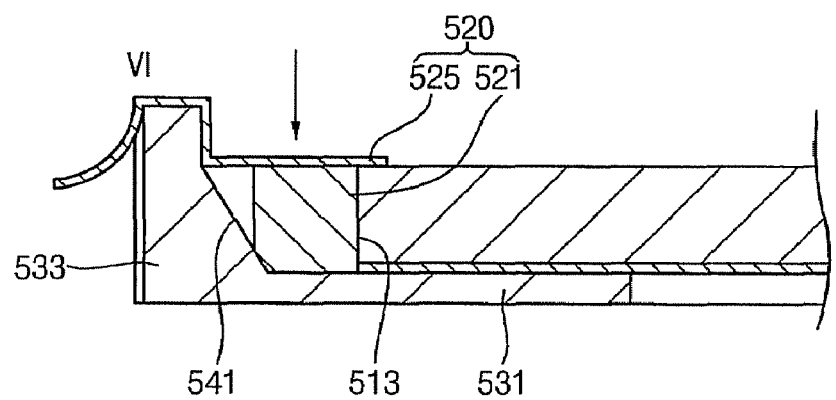

FIG. 20 is a cross-sectional view taken along line VI-VI' in FIG. 18. FIGS. 21A and 21B are cross-sectional views illustrating exemplary point light sources received in an exemplary guiding groove.

Referring to FIG. 20, a point light source 521, such as an LED, mounted on a printed circuit film 525 is disposed in a guiding groove 534. The point light source 521 makes contact with a base face 541 of the guiding groove 534. An inclined surface 522, identified in FIG. 21A, is formed at an end portion of the point light source 521, the end portion contacting the base face 541.

As illustrated in FIG. 21A, the point light source 521 making contact with the base face 541 of the guiding groove 534 slides until it is stopped at the bottom plate 531 as illustrated in FIG. 21B. Thus, the point light source 521 disposed at the bottom plate 531 makes contact with the first side surface 513 of the light-guiding unit 510. Therefore, a gap between the light-guiding unit 510 and the light-generating unit 520 is reduced so that a light-using efficiency increases.

When the backlight assembly 500 is applied to a display apparatus, a display panel disposed on the printed circuit film 525 presses the printed circuit film 525 in a downward direction toward the bottom plate 531. Thus, the point light source 521 is prevented from moving in an upwards direction along the base face 541, and the point light source 521 is bound by the bottom plate 531, the base face 541 and the first side surface 513. Therefore, the light-generating unit 520 is pushed closer to the light-guiding unit 510 and is forced to remain closer to the light-guiding unit 510.

Display Apparatus

Figure 22:
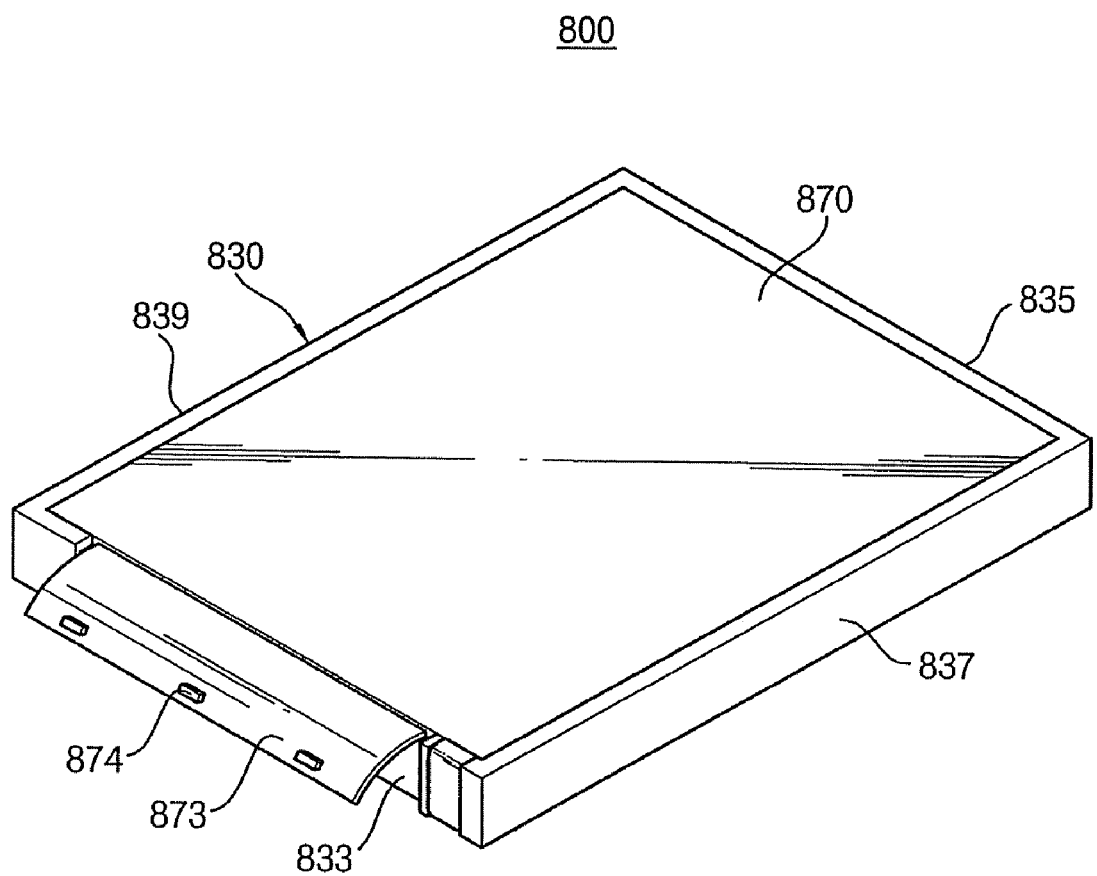
FIG. 22 is a perspective view illustrating an exemplary display apparatus according to an exemplary embodiment of the present invention.
Figure 23:
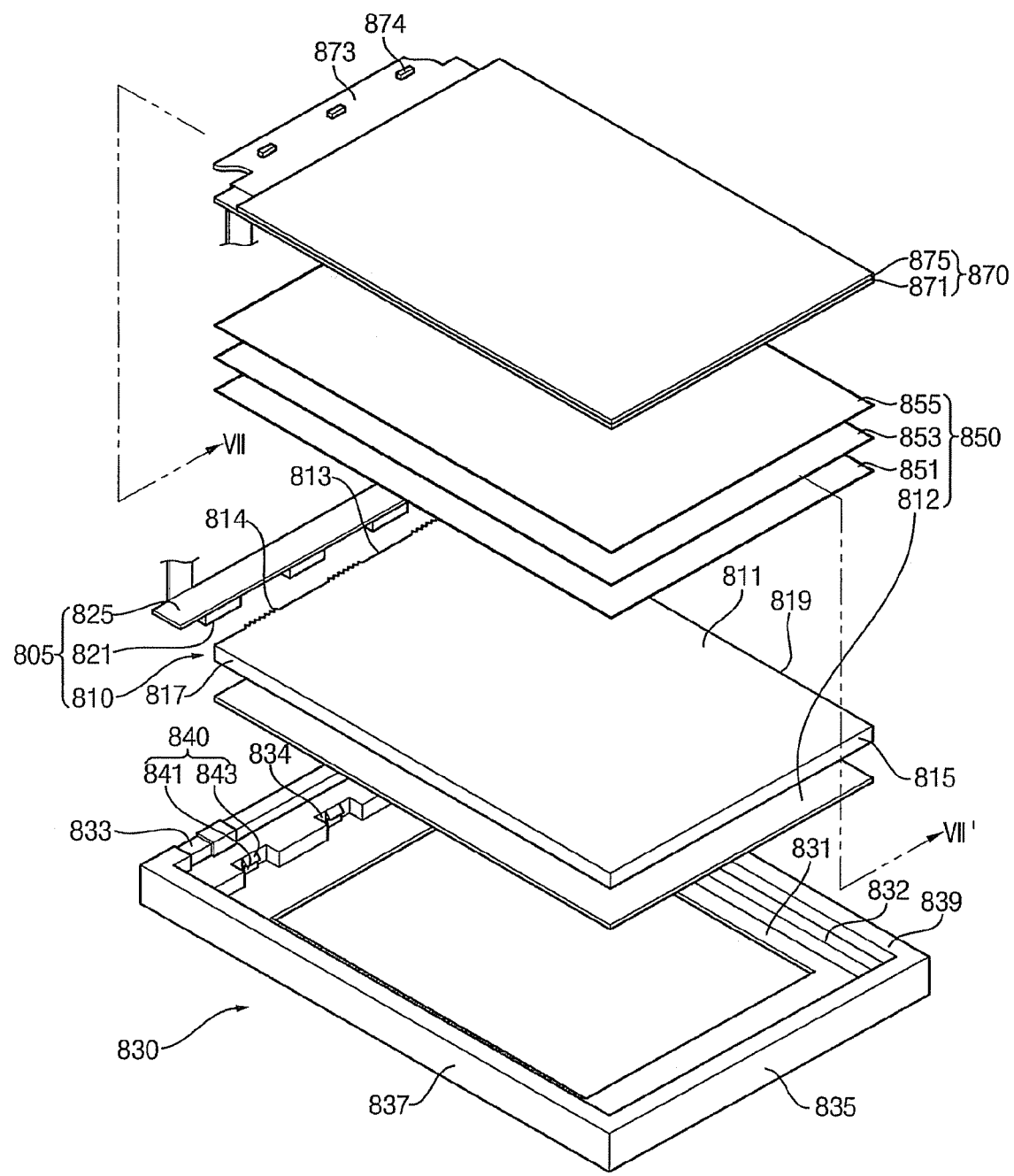
FIG. 23 is an exploded perspective view illustrating the exemplary display apparatus illustrated in FIG. 22.

FIG. 22 is a perspective view illustrating an exemplary display apparatus according to an exemplary embodiment of the present invention. FIG. 23 is an exploded perspective view illustrating the exemplary display apparatus illustrated in FIG. 22.

Referring to FIGS. 22 and 23, a display apparatus 800 includes a backlight assembly 805, a receiving container 830, and a display panel 870. The receiving container 830 receives the backlight assembly 805. The backlight assembly 805 provides the display panel 870 with light.

The backlight assembly 805 includes a light-guiding unit 810 and a light-generating unit having a point light source 821, such as an LED, and a printed circuit film 825. The light-guiding unit 810, the point light source 821, and the printed circuit film 825 are substantially the same as the light-guiding unit 110, the point light source 121 and the printed circuit film 125, respectively illustrated in FIGS. 6 to 9. However, any of the previously described backlight assemblies and receiving containers may be alternatively included in the display apparatus 800.

The receiving container 830 includes a bottom plate 831, a first sidewall 833, a second sidewall 835, a third sidewall 837 and a fourth sidewall 839 and a gap-regulating portion 840. The gap-regulating portion 840 may include a catching jaw surface 841 and a guiding surface 843. The receiving container 830 is substantially the same as the receiving container 130 illustrated in FIG. 7.

The light-guiding unit 810 is disposed at the bottom plate 831. The light-guiding unit 810 includes first, second, third, and fourth side surfaces 813, 815, 817, and 819, a light exiting surface 811, and a counter surface opposite the light exiting surface 811. The first side surface 813 may include light diffusing patterns 814. The point light source 821 mounted on the printed circuit film 825 is disposed in a receiving groove 834 formed at an inner portion of the first sidewall 833 of the receiving container 830. The point light source 821 is pressed toward a first side surface 813 of the light-guiding unit 810 by a protrusion of the gap regulating portion 840 formed at a base portion of the receiving groove 834. Thus, a gap between the light-generating unit and the light-guiding unit 810 is sustained within a pre-designed value range.

Figure 24:
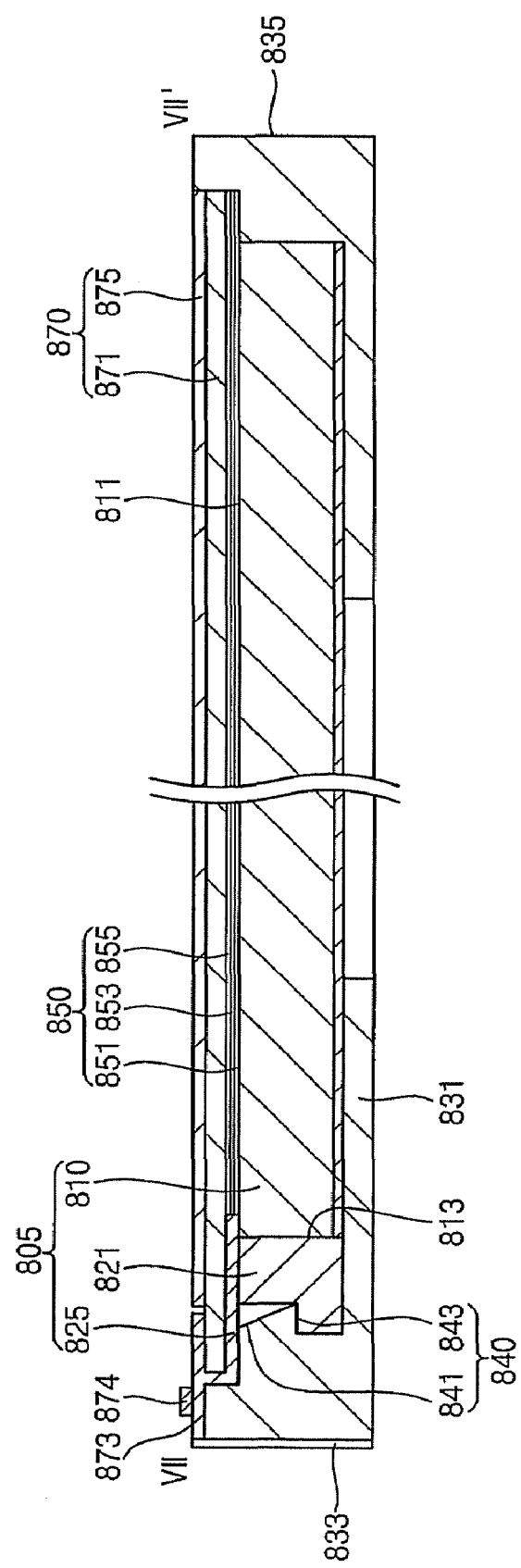
FIG. 24 is a cross-sectional view taken along line VII-VII' in FIG. 23.

FIG. 24 is a cross-sectional view taken along line VII-VII' in FIG. 23.

Referring to FIGS. 22 to 24, the display apparatus 800 further includes optical sheets 850. The optical sheets 850 are disposed with respect to the light-guiding unit 810 to increase an optical property of light exiting from the light-guiding unit 810, for example, brightness and brightness uniformity.

The optical sheets 850 include a reflecting sheet 812, a diffusing sheet 851 and light-condensing sheets 853 and 855. The reflecting sheet 812 is disposed under a counter surface of the light-guiding unit 810 to reflect a light that leaks through the counter face, toward the light-guiding unit 810.

The diffusing sheet 851 is disposed on a light-exiting surface 811 of the light-guiding unit 810 to enhance brightness of light exiting from the light-guiding unit 810. The light-condensing sheets 853 and 855 are disposed on the diffusing sheet 851 to enhance brightness uniformity of light exiting from the diffusing sheet 851.

The display panel 870 displays an image using light that exits from the optical sheets 850. The display panel 870 is disposed at a stepped portion 832 formed at first, second, third and fourth sidewalls 833, 835, 837 and 839. The display panel 870 includes a first substrate 871, a second substrate 875 and a liquid crystal layer disposed between the first and second substrates 871, 875.

The first substrate 871 includes a lower substrate and a switching element. The lower substrate is a transparent substrate, such as glass, on which gate lines are formed in a first direction and date lines insulated from the gate lines are formed in a second direction substantially perpendicular to the first direction. The gate lines and the data lines define pixel areas. The pixel areas are arranged in a matrix configuration.

The switching element, for example, a thin film transistor ("TFT"), is disposed at each pixel area. A source terminal of each TFT is electrically connected to a respective data line. A gate terminal of each TFT is electrically connected to a respective gate line. A drain terminal of each TFT is electrically connected to a pixel electrode for each pixel area, the pixel electrode including optically transparent and electrically conductive material.

The second substrate 875 is spaced apart from the first substrate 871 by a predetermined distance, a cell gap, to face the first substrate 871. The second substrate 875 includes an upper substrate and color filters. The color filters are arranged on the upper substrate in a matrix configuration to correspond to the pixel areas. The color filters may include red, green, and blue ("RGB") color filters through which light is transmitted to display a predetermined color. A common electrode that includes transparent conducting material and corresponds to the pixel electrode, is formed at a whole surface of the upper substrate.

When a gate voltage is applied to the gate terminal to turn-on the TFT, a data voltage is applied to the pixel electrode and generating an electric field between the pixel electrodes and the common electrode. Thus, an arrangement of liquid crystal molecules in the liquid crystal layer between the first substrate 871 and the second substrate 875 varies in response to the electric field. Therefore, a transmittance of light that is provided to the display panel 870 through the optical sheet 850 by the point light source 821, varies so that the display panel 870 displays an image having a desired gray scale.

The display panel 870 further includes a signal-transmitting film 873. A first side edge of the signal-transmitting film 873 is electrically connected to the display panel 870. A second side edge of the signal-transmitting film 873, which is opposite to the first side edge, is electrically connected to the printed circuit film 825. Driving chips 874 that control a panel-driving signal such as the gate voltage and the data voltage, are mounted on the signal-transmitting film 873.

According to the receiving container, the backlight assembly having the receiving container and the display apparatus having the receiving container, a gap-regulating portion, such as a protrusion, a guiding boss, and a guiding groove, is formed at the receiving container to press a light-generating unit having a point light source, such as an LED, toward a light-guiding unit. Therefore, a gap between the light-guiding unit and the light-generating unit is sustained within a pre-designed value range.

Thus, brightness of light exiting from the backlight assembly having the receiving container increases, and power consumption of the backlight assembly is reduced by decreasing light loss. Thus, power consumption of the display apparatus having the backlight assembly is reduced, and display quality is increased by enhancing the brightness.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A receiving container for a display apparatus, the receiving container receiving a light-guiding unit and a light-generating unit disposed adjacent to a side surface of the light-guiding unit, the receiving container comprising:

a bottom plate on which the light-guiding unit is disposed;

a sidewall disposed on a peripheral region of the bottom plate to face the side surface of the light-guiding unit; and a gap-regulating portion formed at the sidewall or the bottom plate, which presses the light-generating unit towards the light-guiding unit, to reduce a gap between the light-generating unit and the light-guiding unit, the gap-regulating portion contacting the light-generating unit.

2. The receiving container of claim 1, wherein the gap-regulating portion is a protrusion protruding from the sidewall to press the light-generating unit toward the light-guiding unit.

3. The receiving container of claim 2, wherein the protrusion comprises:
- a catching jaw surface to support the light-generating unit in a direction substantially perpendicular to the bottom plate and in a direction substantially perpendicular to the side surface; and
- a guiding surface that is slanted with respect to the bottom plate to guide the light-generating unit to the catching jaw surface.

4. The receiving container of claim 1, wherein the light-generating unit comprises a printed circuit film and a light source mounted on the printed circuit film.

5. The receiving container of claim 4, the light source comprises a light-emitting diode.

6. The receiving container of claim 4, wherein the printed circuit film comprises a hole, and the gap-regulating portion is a guiding boss protruding from the sidewall to be inserted into the hole.

7. The receiving container of claim 6, wherein the guiding boss is slanted toward the sidewall.

8. A backlight assembly comprising:
- a light-guiding unit;
- a light-generating unit comprising a printed circuit film and a light source mounted on the printed circuit film, the light-generating unit disposed adjacent to a side surface of the light-guiding unit; and
- a receiving container comprising a bottom plate on which the light-guiding unit is disposed, a sidewall disposed at a peripheral portion of the bottom plate and a gap-regulating portion disposed at the sidewall or the bottom plate which presses the light-generating unit towards the light-guiding unit, to reduce a gap between the light-generating unit and the light-guiding unit, the gap-regulating portion contacting the light-generating unit.

9. The backlight assembly of claim 8, wherein the gap-regulating portion is a protrusion protruding from the sidewall.

10. The backlight assembly of claim 9, wherein the sidewall has a receiving groove, at which the light-generating unit is disposed, the sidewall formed to face the side surface of the light-guiding unit, the protrusion disposed at a base portion of the receiving groove.

11. The backlight assembly of claim 9, wherein the protrusion comprises:
- a guiding surface slanted with respect to the bottom plate, the guiding surface guiding the light-generating unit; and
- a catching jaw surface securing the light-generating unit that is guided by the guiding surface.

12. The backlight assembly of claim 9, wherein a portion of the printed circuit film overlaps with an edge of the light-guiding unit.

13. The backlight assembly of claim 9, wherein the bottom plate has an opening into which the light-generating unit is inserted, and the printed circuit film is disposed at a lower surface of the bottom plate.

14. The backlight assembly of claim 9, wherein the light-generating unit contacts the light-guiding unit.

15. The backlight assembly of claim 8, wherein the gap-regulating portion protrudes from the sidewall and presses the light-generating unit toward the light-guiding unit.

16. The backlight assembly of claim 8, wherein the printed circuit film has a hole, and the gap-regulating portion is a guiding boss protruding from the sidewall and inserted into the hole.

17. The backlight assembly of claim 16, wherein the guiding boss is slanted toward the sidewall.

18. The backlight assembly of claim 17, wherein the sidewall has receiving grooves facing the side surface of the light-guiding unit, and the guiding boss is disposed on the sidewall between the receiving grooves.

19. The backlight assembly of claim 8, wherein the gap-regulating portion is a guiding groove formed at a portion of the sidewall corresponding to the light-generating unit.

20. The backlight assembly of claim 19, wherein the guiding groove faces the side surface of the light-guiding unit, and a base face of the guiding groove contacts the light-generating unit, and the base face is slanted to guide the light-generating unit to the light-guiding unit.

21. The backlight assembly of claim 20, wherein the light source comprises an inclined surface formed at an end portion of the light source, the inclined surface contacting the base face.

22. The backlight assembly of claim 8, wherein the light-guiding unit further comprises a light-diffusing pattern formed at the side surface of the light-guiding unit and corresponding to the light-generating unit.

23. A display apparatus comprising:
- a backlight assembly comprising a light-guiding unit and a light-generating unit having a light source disposed adjacent to a side surface of the light-guiding unit and a printed circuit film on which the light-generating unit is mounted;
- a receiving container comprising a bottom plate on which the light-guiding unit is disposed, a sidewall disposed on a peripheral region of the bottom plate, and a gap-regulating portion which presses the light-generating unit towards the light-guiding unit, to reduce a gap between the light-generating unit and the light-guiding unit, the gap-regulating portion contacting the light-generating unit; and
- a display panel disposed on the light-guiding unit.

24. The display apparatus of claim 23, wherein the gap-regulating portion protrudes from the sidewall and comprises:
- a catching jaw surface supporting the light-generating unit in a direction substantially perpendicular to the bottom plate and in a direction substantially perpendicular to the side surface of the light-guiding unit; and
- a guiding surface guiding the light-generating unit to the catching jaw surface.

25. The display apparatus of claim 23, wherein the printed circuit film is disposed between the light-generating unit and the display panel.

26. The display apparatus of claim 23, further comprising an optical sheet disposed between the light-guiding unit and the display panel, and wherein the sidewall comprises a stepped portion supporting the display panel.

27. A method of reducing a loss of light from a light-generating unit in a backlight assembly, the method comprising:
- sliding a light-generating unit including a light source over a gap regulating portion protruding from a sidewall of a receiving container, the sidewall adjacent to a light incident surface of a light guiding unit disposed in the receiving container; and,
- retaining the light-generating unit in position adjacent the light incident surface of the light-guiding unit by the gap regulating portion to reduce a gap between the light-generating unit and the light incident surface.

28. The method of claim 27, wherein sliding the light-generating unit over the gap regulating portion includes sliding the light-generating unit over a guiding surface of the gap regulating portion, the guiding surface slanted towards the light incident surface such that the light-generating unit moves closer to the light incident surface as the light-generating unit slides over the guiding surface.

29. The method of claim 28, further comprising, subsequent to sliding the light-generating unit over the guiding surface of the gap regulating portion, fixing the light-generating unit in place by a catching jaw surface of the gap regulating portion.

30. The method of claim 27, wherein sliding the light-generating unit over the gap regulating portion includes threading a hole in a printed circuit film of the light-generating unit over a slanted guiding boss of the gap regulating portion, the light-generating unit moving closer to the light incident surface as the printed circuit film is threaded over the slanted guiding boss.

* * * * *